United States Patent
Buckley et al.

(10) Patent No.: US 11,438,755 B2
(45) Date of Patent: Sep. 6, 2022

(54) STEERING OF ROAMING IN WIRELESS COMMUNICATION NETWORKS

(71) Applicant: BlackBerry Limited, Waterloo (CA)

(72) Inventors: Adrian Buckley, Tracy, CA (US); Jan Hendrik Lucas Bakker, Fort Worth, TX (US)

(73) Assignee: BlackBerry Limited, Waterloo (CA)

( * ) Notice: Subject to any disclaimer, the term of this patent is extended or adjusted under 35 U.S.C. 154(b) by 10 days.

(21) Appl. No.: 17/185,761

(22) Filed: Feb. 25, 2021

(65) Prior Publication Data

US 2021/0185508 A1 Jun. 17, 2021

Related U.S. Application Data

(63) Continuation of application No. 15/952,846, filed on Apr. 13, 2018, now Pat. No. 10,952,062.

(60) Provisional application No. 62/635,483, filed on Feb. 26, 2018.

(51) Int. Cl.
*H04W 8/06* (2009.01)
*H04W 12/06* (2021.01)
*H04W 84/04* (2009.01)
*H04W 48/18* (2009.01)

(52) U.S. Cl.
CPC .............. *H04W 8/06* (2013.01); *H04W 12/06* (2013.01); *H04W 48/18* (2013.01); *H04W 84/042* (2013.01)

(58) Field of Classification Search
CPC ....... H04W 8/06; H04W 12/06; H04W 48/18; H04W 84/042
See application file for complete search history.

(56) References Cited

U.S. PATENT DOCUMENTS

| 10,952,062 B2 | 3/2021 | Buckley et al. |
| 2010/0064344 A1 | 3/2010 | Wang |
| 2010/0322216 A1 | 12/2010 | Roger et al. |
| 2012/0282898 A1 | 11/2012 | Lee et al. |
| 2013/0109377 A1 | 5/2013 | Al-Khudairi |
| 2013/0217391 A1 | 8/2013 | Klatt et al. |
| 2014/0357315 A1 | 12/2014 | John |
| 2015/0065125 A1* | 3/2015 | Patel ........................ H04W 8/12 455/433 |

(Continued)

FOREIGN PATENT DOCUMENTS

WO  WO2019017689  1/2019

OTHER PUBLICATIONS

Non-Final Office Action issued in U.S. Appl. No. 15/952,846 dated Sep. 25, 2018, 27 pages.

(Continued)

*Primary Examiner* — Said M Elnoubi
(74) *Attorney, Agent, or Firm* — Fish & Richardson P.C.

(57) ABSTRACT

A method for steering of roaming (SOR) in wireless communication networks includes sending by a mobile equipment (ME) a registration message to a visited public land mobile network (VPLMN). The ME receives a first message from a home public land mobile network (HPLMN) through the VPLMN. The ME determines that the first message has failed a security check. In response to determining that the first message has failed the security check, the ME sends a second message to the VPLMN, the second message including an indication that the first message has failed the security check.

18 Claims, 26 Drawing Sheets

(56) References Cited

U.S. PATENT DOCUMENTS

2018/0227872 A1 8/2018 Li et al.
2019/0268752 A1 8/2019 Buckley et al.

OTHER PUBLICATIONS

Final Office Action issued in U.S. Appl. No. 15/952,846 dated Feb. 14, 2019, 20 pages.
Advisory Action issued in U.S. Appl. No. 15/952,846 dated Apr. 22, 2019, 2 pages.
Non-Final Office Action issued in U.S. Appl. No. 15/952,846 dated Jul. 8, 2019, 25 pages.
Final Office Action issued in U.S. Appl. No. 15/952,846 dated Dec. 6, 2019, 21 pages.
Notice of Allowance issued in U.S. Appl. No. 15/952,846 dated Oct. 16, 2020, 9 pages.
3rd Generation Partnership Project, "3GPP TS 24.008 v15.1.0: 3rd Generation Partnership Project; Technical Specification Group Core Network and Terminals; Mobile Radio Interface Layer 3 specification; Core network protocols; Stage 3 (Release 15)," 3GPP TS 24.008, Dec. 2017, 785 pages.
3rd Generation Partnership Project, "3GPP TS 24.302 V15.1.1: 3rd Generation Partnership Project; Technical Specification Group Core Network and Terminals; Access to the 3GPP Evolved Packet Core (EPC) via non-3GPP access networks; Stage 3 (Release 15)," 3GPP TS 24.302, Dec. 2017, 171 pages.
3rd Generation Partnership Project, "3GPP TS 23.122 V15.2.0, 3rd Generation Partnernship Project; Technical Specification Group Core Network and Terminals; Non-Access-Stratum (NAS) function related to Mobile Station (MS) in idle mode (Release 15)," 3GPP TS 23.122, Dec. 2017, 54 pages.
3rd Generation Partnership Project, "3GPP TS 23.501 V15.0.0: 3rd Generation Partnership Project; Technical Specification Group Services and Systems Aspects; System Architecture for the 5G System; Stage 2 (Release 15)," 3GPP 23.501, Dec. 2017, 181 pages.
3rd Generation Partnership Project, "3GPP TS 23.502 V15.0.0: 3rd Generation Partnership Project; Technical Spcification Group Services and Systems Aspects; Procedures for the 5G System; Stage 2 (Release 15)," 3GPP TS 23.502, Dec. 2017, 258 pages.
3rd Generation Partnership Project, "3GPP TS 24.501 V0.2.2: 3rd Generation Partnership Project; Technical Specification Group Core Network and Terminals; Non-Access-Stratum (NAS) Protocol for 5G System (5GS); Stage 3 (Release 15)," 3GPP TS 24.501, Dec. 2017, 179 pages.
3rd Generation Partnership Project, "3GPP TS 31.111 V15.0.0: 3rd Generation Partnership Project; Technical Group Core Network and Terminals; Universal Subscriber Identity Module (USIM) Application Toolkit (USAT) (Release 15)," 3GPP TS 31.111, Dec. 2017, 148 pages.
3rd Generation Partnership Project, "3GPP TS 33.501 v0.6.0: 3rd Generation Partnership Project; Technical Specification Group Services and System Aspects; Security architecture and procedures for 5G System (Release 15)," 3GPP TS 33.501, Dec. 2017, 79 pages.
3rd Generation Partnership Project/European Telecommunications Standards Institute, "ETSI TS 123 122 V14.4.0, Technical Specification, Digital cellular telecommunications system (Phase 2+) (GSM); Universal Mobile Telecommunications System (UMTS); LTE; Non-Access-Stratum (NAS) functions related to Mobile Station (MS) in idle mode (3GPP TS 23.122 version 14.4.0 release 14)," ETSI TS 123 122/3GPP TS 23.122, Oct. 2017, 57 pages.
3rd Generation Partnership Project/European Telecommunications Standards Institute, "ETSI TS 131 102 V14.4.0, Technical Specification, Universal Mobile Telecommunications System (UMTS); LTE; Characteristics of the Universal Subscriber Identity Module (USIM) application (3GPP TS 31.102 version 14.4.0 Release 14)" ETSI TS 131 102/3GPP TS 31.102, Jan. 2018, 298 pages.
3rd Generation Partnership Project/European Telecommunications Standards Institute, "ETSI TS 131 111 V10.4.0, Technical Specification, Digital cellular telecommunications system (Phase 2+); Universal Mobile Telecommunications System (UMTS); LTE; Universal Subscriber Identity Module (USIM) Application Toolkit (USAT) (3GPP TS 31.111 version 10.4.0 Release 10," ETSI TS 131 111/3GPP TS 31.111, Nov. 2011, 126 pages.
Aboba et al., "Extensible Authentication Protocol (EAP)," RFC 3748, the Internet Society, Jun. 2004, 67 pages.
Arkko et al., "Extensible Authentication Protocol Method for 3rd Generation Authentication and Key Agreement (EAP-AKA)," RFC 4187, the Internet Society, Jan. 2006, 79 pages.
Arkko et al., "Improved Extensible Authentication Protocol Method for 3rd Generation Authentication and Key Agreement (EAP-AKA)," RFC 5448, IETF Trust, May 2009, 29 pages.
European Telecommunications Standards Institute, "ETSI TS 102 225 V12.1.0, Technical Specification, Smart Cards; Secured packet structure for UICC based applications (Release 12)," ETSI TS 102 225 V12.1.0, Oct. 2014, 22 pages.
European Telecommunications Standards Institute, "ETSI TS 102 223 V14.0.0, Technical Specification: Smart Cards; Card Application Toolkit (CAT) (Release 14)," ETSI TS 102 223, May 2017, 247 pages.
Kaufman et al., "Internet Key Exchange Protocol Version 2 (IKEv2)," RFC 7269, Internet Engineering Task Force (IETF), Oct. 2014, 142 pages.
PCT International Search Report & Written Opinion issued in International Application No. PCT/US2019/019508, dated Apr. 10, 2019, 20 pages.
Qualcomm Incorporated, "Control Plane Solution for Steering of Roaming in 5GS," 3GPP TSG-CT WG1 Meeting #106 (c1-174151), Kochi (India), Oct. 23-27, 2017, 3 pages.
Samsung, "p-CR for Securely Transmitting Preferred PLMN List to UE," 3GPP TSG-CT WG1 Meeting #107 (C1-175066), Reno (USA), Nov. 27-Dec. 1, 2017, 4 pages.
Communication Pursuant to Article 94 (3) EPC issued in European Application No. 19710543.0, dated Sep. 15, 2021, 12 pages.
Huawei et al., "Discussion Paper for Steering of Roaming" 3GPP Draft, Discussion Paper for Steering of Roaming, 3GPP TSG SA WG3 (Security), Meeting #89, S3-173235, Sophia-Antipolis Cedex, France, Nov. 27-Dec. 1, 2017, 5 pages.

* cited by examiner

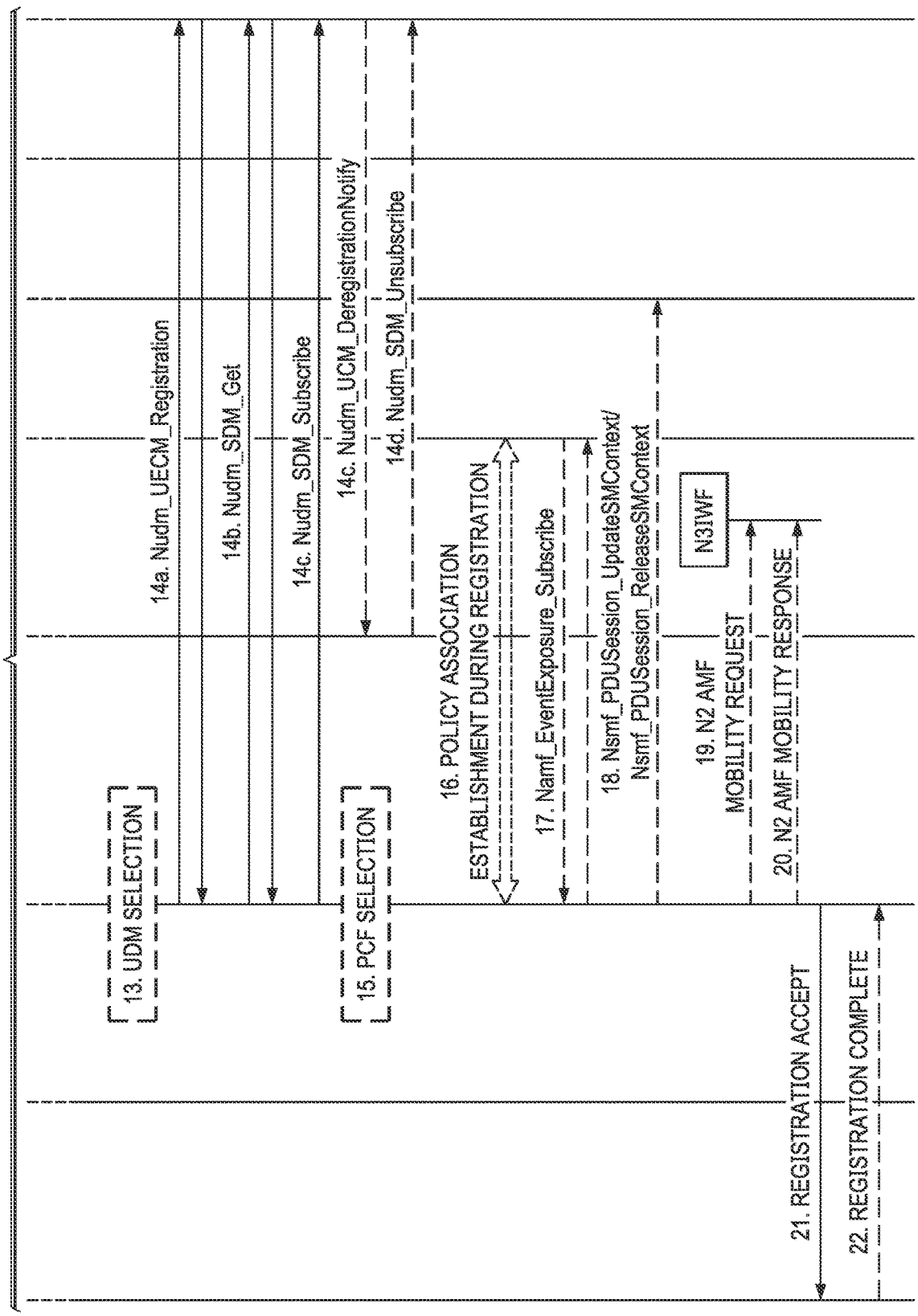

FIG. 4A 5.5.1.2.2    Initial registration initiation

The UE initiates the registration procedure for initial registration by sending a REGISTRATION REQUEST message to the AMF, starting timer T3510. If timer T3502 is currently running, the UE shall stop timer T3502. If timer T3511 is currently running, the UE shall stop timer T3511.

If the UE holds a valid 5G-GUTI, the UE shall indicate the 5G-GUTI in the 5GS mobile identity IE. If the UE does not hold a valid 5G-GUTI, the UE shall include the SUCI in the 5GS mobile identity IE. If the UE is initiating the registration procedure for emergency services and does not hold a valid 5G-GUTI, 4G-GUTI or SUCI, the PEI shall be included in the 5GS mobile identity IE.

If the UE operating in the single-registration mode holds a valid 4G-GUTI only, the UE shall include the 5G-GUTI IE mapped from the 4G-GUTI as specified in 3GPP TS 23.003 [2] in the 5GS mobile identity IE of the REGISTRATION REQUEST message. If the UE operating in the single-registration mode holds a valid 4G-GUTI and a valid 5G-GUTI, it shall include in the 5GS mobile identity IE of the REGISTRATION REQUEST message either 5G-GUTI mapped from 4G-GUTI or 5G-GUTI according to the system (i.e. either EPS or 5GS), where the last successful EPS attach, tracking area updating or registration procedure was performed.

If the UE is operating in the dual-registration mode, the UE shall include the UE status IE with the EMM registration status set to "UE is in EMM-REGISTERED state". If the UE has a valid 5G-GUTI, the UE shall include the 5G-GUTI in the REGISTRATION REQUEST message. The UE operating in the dual-registration mode shall not use 4G-GUTI even if the UE has a valid 4G-GUTI.

If the last visited registered TAI is available, the UE shall include the last visited registered TAI in the REGISTRATION REQUEST message.

If the UE requests the use of SMS over NAS, the UE shall include the SMS requested IE in the REGISTRATION REQUEST message and set:
    a) the "supported accesses" bits of the SMS requested IE to:

1) "SMS over NAS supported via 3GPP access only" if the UE supports SMS delivery over NAS via 3GPP access only; or 2) "SMS over NAS supported via both 3GPP access and non-3GPP access" if the UE supports SMS delivery over NAS via both 3GPP access and non-3GPP access; and Editor's note: A decision still needs to be made on whether "one step" functionality needs to be added.

If the UE supports MICO mode and requests the use of MICO mode, then the UE shall include the MICO indication IE in the REGISTRATION REQUEST message.

If the UE is performing a REGISTRATION REQUEST because the UE selected the network manually (see 3GPP TS 23.122) then the UE shall include the Device Type IE

FROM FIG. 4A with an indicator set to indicate Manual Network selection mode.
If the UE is performing a REGISTRATION REQUEST and the UE is battery constrained then the UE shall include the Device Type IE with an indicator set to indicate Battery Constrained or Resource Constrained.
If the UE is performing a REGISTRATION REQUEST and the UE is mobility constrained then the UE shall include the Device Type IE with an indicator set to indicate Battery Constrained or Resource Constrained.

8.2.5 Registration request
8.2.5.1 Message definition
The REGISTRATION REQUEST message is sent by the UE to the AMF. See table 8.2.5.1.1.
    Message type: REGISTRATION REQUEST
    Significance:         dual
    Direction:           UE to network Table 8.2.5.1.1: REGISTRATION REQUEST message content

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | 1/2 |
| | Spare half octet | Spare half octet 9.5 | M | V | 1/2 |
| | o o o | | | | |
| | Device Type | Device Type 9.8.3.x | O | TLV | |

9.8.3.X     Device Type
The purpose of the Device Type information element is to indicate the type of device.
The Device Type information element is coded as shown in figure 9.8.3.X and table 9.8.3.X.
The Device Type information element is a type 4 information element with minimum length of 4 octets and a maximum length of 34 octets.

TO FIG. 4C

FROM FIG. 4B

| 8 | 7 | 6 | 5 | 4 | 3 | 2 | 1 | |
|---|---|---|---|---|---|---|---|---|
| Device Type IEI | | | | | | | | octet 1 |
| Length of Device Type contents | | | | | | | | octet 2 |
| DTI (7) | DTI (6) | DTI (5) | DTI (4) | DTI (3) | DTI (2) | DTI (1) | DTI (0) | octet 3 |
| DTI (15) | DTI (14) | DTI (13) | DTI (12) | DTI (11) | DTI (10) | DTI (9) | DTI (8) | octet 4 |
| 0 | 0 | 0 | 0 | 0 | 0 | 0 | 0 | octet 5*-34* |
| spare | | | | | | | | |

Figure 9.8.2.2.1: PDU session status information element

Table 9.8.2.2.1: PDU session status information element

DTI(x) shall be coded as follows:

DTI(0) – DTI(4):
Bits 1 to 5 of octet 3 are spare and shall be coded as zero.

DTI(5):
0    indicates that the device is not a battery constrained device.
1    indicates that the device is a battery or resource constrained device DTI(6):
0    indicates that the device is not a mobility constrained device.
1    indicates that the device is a mobility constrained device DTI(7):
0    indicates that the device is not in manual network selection mode.
1    indicates that the device is in manual network selection mode All other bits are reserved All bits in octet 5 to 34 are spare and shall be coded as zero, if the respective octet is included in the information element.

6.2.5 SORInfo configuration

........

6.XA   SORInfo configuration
6.XA.1   UE Procedures 5-6) then the UE:

a) shall include the AT_SORInfo_REQUEST attribute according to subclause 8.2.X.2 in the EAP-Response/AKA'-Challenge message. In the message field according to subclause 8.1.4.1 of the AT_SORInfo_REQUEST attribute, the UE shall:

1) set the message type field to SORInfo_REQUEST; and 2) contains the type field including the SORInfo Request field item as described in subclause 8.2.X.2 indicating SORInfo requested; and c) the UE requests usage of the " SORInfo "; If the UE selected the RPLMN because it was in Manual network selection mode the UE includes "Manual network selection mode". If the UE is battery constrained it includes " Battery constrained "

....

8.2.X.2   AT_SORInfo_Request attribute

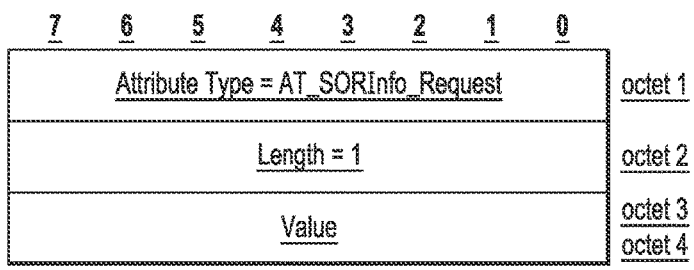

Figure 8.2.X.2-1: AT_SORInfo_Request attribute

Table 8.2.X.1-1: : AT_SORInfo_Request attribute

Octet 1 (in Figure 8.2.X.2-1) indicates the type of attribute as AT_SORInfo_Request with a value of 1XX.

Octet 2 (in Figure 8.2.X.2-1) is the length of this attribute which shall be set to 1 as per IETF RFC 4187 [33]

Octet 3 (in Figure 8.2.X.2-1) and 4 (in Figure 8.2.X.2-1) are the value of the attribute. Octet 3 (in Figure 8.2.X.2-1) is reserved and shall be coded as zero. Octet 4 (in Figure 8.2.X.2-1) shall be set as follows. All other values are reserved.

| 7 | 6 | 5 | 4 | 3 | 2 | 1 | 0 | SORInfo requested field |
|---|---|---|---|---|---|---|---|---|
| 0 | 0 | 0 | 0 | 0 | 0 | 0 | 1 | SORInfo requested |
| 0 | 0 | 0 | 0 | 0 | 0 | 1 | 0 | Manual network selection mode |
| 0 | 0 | 0 | 0 | 0 | 0 | 1 | 0 | Battery constrained |
| 1 | 1 | 1 | 1 | 1 | 1 | 1 | 1 | Reserved |

FIG. 8A

> 6.2.5 SORInfo configuration
>
> If the UE performs 3GPP-based access authentication, the 3GPP AAA server may send a list of emergency numbers from the non-3GPP access network to the UE during the EAP-AKA or EAP-AKA' based access authentication (i.e. EAP-AKA, EAP-AKA'). The indicator is sent using a AT_SORInfo_RESP, by extending the EAP-AKA (and EAP-AKA') protocol as specified in subclause 8.2 of IETF RFC 4187 [33]. This attribute is provided in EAP-Request/AKA-Challenge or EAP- Request/AKA'-Challenge message payload respectively. The detailed coding of this attribute is described in subclause 8.2.X.1.
>
> 6.XA      SORInfo configuration
>
> 6.XA.1 UE Procedures
>
> 4)    If:
>
>    a) the UE supports the "Configuration request";
>
>    b) the EAP-Request/AKA'-Challenge message includes the AT_SORInfo_REQUEST_SUPPORTED attribute as described in subclause 8.2.X.1 wherein the message field as described in subclause 8.1.4.1:
>
>      1) contains the message type field indicating SORInfo_REQUEST_SUPPORTED; and
>
>      2) contains the type field including the SORInfo Request Supported field item as described in subclause 8.2.X.1 indicating SORInfo Supported; and
>
>    c) the UE requests usage of the " SORInfo ";
>
> 5-6) then the UE:
>
>    a) shall include the AT_SORInfo_REQUEST attribute according to subclause 8.2.X.2 in the EAP-Response/AKA'-Challenge message. In the message field according to subclause 8.1.4.1 of the AT_SORInfo_REQUEST attribute, the UE shall:
>
>      1) set the message type field to SORInfo_REQUEST; and
>
>      2) contains the type field including the SORInfo Request field item as described in subclause 8.2.X.2 indicating SORInfo requested; and
>
> 7-8) Upon receiving the EAP-Request/AKA'-Notification message including the AT_SORInfo_RESP attribute as described in subclause 8.2.X.3 where the message field as described in subclause 8.1.4.1:
>
>    - contains the message type field indicating SORInfo_RESP; and
>
>    - contains the field SORInfo Encoded;
>
> the UE:
>
>    - sends the information to the UICC
>
> 6.XA.2 AAA Procedures

TO FIG. 8B

FROM FIG. 8A

The 3GPP AAA server may support SORInfo configuration.

4) If the network supports SORInfo configuration, the 3GPP AAA server shall include a) in the EAP-Request/AKA'-Challenge message, the AT_SORInfo_REQUEST_SUPPORTED attribute as described in subclause 8.2.X.1, wherein the message field as described in subclause 8.1.4.1:

1) contains the message type field indicating SORInfo_REQUEST_SUPPORTED; and 2) contains the type field including the SORInfo Request Supported field item as described in subclause 8.2.X.1 indicating SORInfo Supported; and 5-6) If the 3GPP AAA server supports SORInfo configuration; and the AAA server receives the AT_SORInfo_REQUEST attribute according to subclause 8.2.X.2 in the EAP-Response/AKA'-Challenge message and In the message field according to subclause 8.1.4.1 of the AT_SORInfo_REQUEST attribute 1) the message type field is set to SORInfo_REQUEST; and 2) contains the type field including the "SORInfo_REQUEST_SUPPORTED" value (see Table 8.1.4.1-2) as described in subclause 8.2.X.2 indicating SORInfo requested;

then the AAA server optionally contacts an external database e.g. HSS, PCRF, OTA server to obtain the SORInfo to be used and provides those SORInfo in the EAP-RSP/AKA'-identity message.

7-8) The AAA sends the EAP-Request/AKA'-Notification message including the AT_SORInfo_RESP attribute as described in subclause 8.2.X.3 where the message field as described in subclause 8.1.4.1:

- contains the message type field indicating SORInfo_RESP; and

- contains the field SORInfo Encoded as described in subclause 8.2.x.3.2;

8)    PDUs and parameters specific to the present document 8.1 3GPP specific coding information defined within present document 8.1.4 PDUs for TWAN connection modes 8.1.4.1 Message The message is coded according to table 8.1.4.1-2.

FROM FIG. 8B

Table 8.1.4.1-2: Message type

The value is coded as follows.

| 7 | 6 | 5 | 4 | 3 | 2 | 1 | 0 | |
|---|---|---|---|---|---|---|---|---|
| 0 | 0 | 0 | 0 | 0 | 0 | 0 | 1 | CONNECTION_CAPABILITY |
| 0 | 0 | 0 | 0 | 0 | 0 | 1 | 0 | SCM_REQUEST |
| 0 | 0 | 0 | 0 | 0 | 0 | 1 | 1 | SCM_RESPONSE |
| 0 | 0 | 0 | 0 | 0 | 1 | 0 | 0 | MCM_REQUEST |
| 0 | 0 | 0 | 0 | 0 | 1 | 0 | 1 | MCM_RESPONSE |
| 0 | 0 | 0 | 0 | 0 | 1 | 1 | 1 | SORInfo_REQUEST_SUPPORTED |
| 0 | 0 | 0 | 0 | 1 | 0 | 0 | 0 | SORInfo_REQUEST |

8.2.X Identity attributes 8.2.X.1 AT_SORInfo_Request Supported attribute

| 7 | 6 | 5 | 4 | 3 | 2 | 1 | 0 | |
|---|---|---|---|---|---|---|---|---|
| Attribute Type = AT_SORInfo_request supported ||||||||  octet 1 |
| Length = 1 ||||||||  octet 2 |
| Value ||||||||  octet 3 octet 4 |

Figure 8.2.X.1-1: AT_SORInfo_Request Supported attribute

Table 8.2.X.1-1: : AT_SORInfo_Request Supported

Octet 1 (in Figure 8.2.X.1-1) indicates the type of attribute as AT_SORInfo_Request Supported.

Octet 2 (in Figure 8.2.X.1-1) is the length of this attribute which shall be set to 1 as per IETF RFC 4187 [33]

Octets 3 (in Figure 8.2.X.1-1) and 4 (in Figure 8.2.X.1-1) are the value of the attribute. Octet 3 (in Figure 8.2.X.1-1) is reserved and shall be coded as zero. Octet 4 (in Figure 8.2.X.1-1) shall be set as follows. All other values are reserved.

| 7 | 6 | 5 | 4 | 3 | 2 | 1 | 0 | |
|---|---|---|---|---|---|---|---|---|
| 0 | 0 | 0 | 0 | 0 | 0 | 0 | 0 | SORInfo Request Supported field |
| 0 | 0 | 0 | 0 | 0 | 0 | 0 | 1 | SORInfo Request Supported |
| 0 | 0 | 0 | 0 | 0 | 0 | 1 | 0 | SORInfo Request not supported |
| 1 | 1 | 1 | 1 | 1 | 1 | 1 | 1 | Reserved |

FROM FIG. 8C 8.2.X.2      AT_SORInfo_Request attribute

| 7 | 6 | 5 | 4 | 3 | 2 | 1 | 0 | |
|---|---|---|---|---|---|---|---|---|
| Attribute Type = AT_SORInfo_Request ||||||||  octet 1 |
| Length = 1 |||||||| octet 2 |
| Value |||||||| octet 3 / octet 4 |

Figure 8.2.X.2-1: AT_SORInfo_Request attribute

Table 8.2.X.2-1: : AT_SORInfo_Request attribute

Octet 1 (in Figure 8.2.X.2-1) indicates the type of attribute as AT_SORInfo_Request with a value of 1XX.

Octet 2 (in Figure 8.2.X.2-1) is the length of this attribute which shall be set to 1 as per IETF RFC 4187 [33]

Octet 3 (in Figure 8.2.X.2-1) and 4 (in Figure 8.2.X.2-1) is the value of the attribute. Octet 3 (in Figure 8.2.X.2-1) is reserved and shall be coded as zero. Octet 4 (in Figure 8.2.X.2-1) shall be set as follows. All other values are reserved.

| 7 | 6 | 5 | 4 | 3 | 2 | 1 | 0 | SORInfo requested field |
|---|---|---|---|---|---|---|---|---|
| 0 | 0 | 0 | 0 | 0 | 0 | 0 | 1 | SORInfo requested |
| 0 | 0 | 0 | 0 | 0 | 0 | 1 | 0 | Reserved |
| 1 | 1 | 1 | 1 | 1 | 1 | 1 | 1 | Reserved |

8.2.X.3 AT_SORInfo_RESP attribute 8.2.X.3.1 General

| 7 | 6 | 5 | 4 | 3 | 2 | 1 | 0 | |
|---|---|---|---|---|---|---|---|---|
| Attribute Type = AT_SORInfo_RESP |||||||| octet 1 |

TO FIG. 8E

FROM FIG. 8D

| | octet 2 |
|---|---|
| Length = 1 | octet 3 |
| Value | octet Z |

Figure 8.2.X.3-1: AT_SORInfo_RESP attribute

8.2.x.3.2 SORInfo encoded

There may be multiple SORInfos encoded in the AT_SORInfo_RESP_attribute.

| 7 | 6 | 5 | 4 | 3 | 2 | 1 | 0 | |
|---|---|---|---|---|---|---|---|---|
| SORInfo encoded ||||||||  octet 1 |
| Length = 1 |||||||| octet 2 |
| SORInfo |||||||| octet 3 |
|  |||||||| octet Z |

Figure 8.2.X.3-1: AT_SORInfo RESP attribute Value

Table 8.2.X.3-1: : AT_SORInfo_RESP attribute Value

| Octet 1 (in Figure 8.2.X.3-1) indicates the identity that is encoded. |||||||||
|---|---|---|---|---|---|---|---|---|
| Octet 1 (in Figure 8.2.X.3-1) shall be set as follows. All other values are reserved. |||||||||
| 7 | 6 | 5 | 4 | 3 | 2 | 1 | 0 | SORInfo Encoded field |
| 0 | 0 | 0 | 0 | 0 | 0 | 0 | 1 | SORInfo binary |
| 0 | 0 | 0 | 0 | 0 | 0 | 1 | 0 | Reserved |
| 0 | 0 | 0 | 0 | 0 | 0 | 1 | 1 | Reserved to |
| 1 | 1 | 1 | 1 | 1 | 1 | 1 | 1 | Reserved |

8.2.x.3.3 SORInfo

The SORInfo field is a binary information encoded as ETSI TS 102 225 [SecPac].

FIG. 8E

6.6.13 REFRESH
For all REFRESH modes except "Steering of Roaming", see ETSI TS 102 223 [32] clause 6.6.13.
For "Steering of Roaming":

| Description | Clause | M/O/C | Min | Length |
|---|---|---|---|---|
| Proactive UICC command Tag | 9.2 | M | Y | 1 |
| Length (A+B+C+D+E+F+G+H) | - | M | Y | 1 or 2 |
| Command details | 8.6 | M | Y | A |
| Device identities | 8.7 | M | Y | B |
| Alpha identifier | 8.2 | O | N | C |
| Icon identifier | 8.31 | O | N | D |
| Text Attribute | 8.70 | C | N | E |
| Frame Identifier | 8.82 | O | N | F |
| PLMNwAcT List | 8.90 | C (See Note 1) | N | G |
| PLMN List | 8.97 | C (See Note 2) | N | H |
| (5G) PLMN List | 8.x1 | C (Note 3) | N | H |
| (5G) PLMNwAcT List | 8.x2 | C (Note 3) | N | H |

Note 1: This parameter is required in case of steering of roaming (according to TS 23.122 [7]).
Note 2: This parameter is required in case of steering of roaming for I-WLAN (according to TS 24.234 [42]).
Note 3: This parameter is required in case of steering of roaming (according to TS 23.122 [7] and TS 24.501).

1) The UE to the VPLMN AMF: The UE initiates registration by sending REGISTRATION REQUEST message to the VPLMN AMF, and the VPLMN AMF initiates the authentication procedure as defined in 3GPP TS 33.501 [19]. <u>The UE optionally includes if it has registered on this PLMN (network) before and has performed SOR. The UE optionally includes an indication of the registration is as a result of manual network selection.</u>

2) The VPLMN AMF to the HPLMN AUSF: The VPLMN AMF sends Authentication Initiation Request (5G-AIR) message to HPLMN AUSF.

3) The HPLMN AUSF to the HPLMN UDM: The HPLMN AUSF sends Auth Info-Req request message to the HPLMN UDM.

4) The HPLMN UDM decides to provide the list of preferred PLMN/access technology combinations to the UE, based on operator policy, and includes secure packet (as defined in ETSI TS 102 225 [SecPac] ~~then set an indication in an AV to indicate the UE that the list of preferred PLMN/access technology combinations are provided.~~ <u>If UDM shall not send back a list of preferred PLMN/access technologies if either of the following have occurred:</u>

<u>a) The UE is in manual network selection mode; or</u>

<u>b) An indication is received that the UE has previosily registered on this PLMN before and received SOR data.</u>

8) If the UE has successfully authenticated the network(see 3GPP TS 33.501 [19]), after receiving the NAS AUTHENTICATION REQUEST message:

a) The UE ~~checks the indication included in an AV to determine whether a list of preferred PLMN/access technology combinations was provided by the HPLMN and then performs security check on the received preferred PLMN/access technology combinations~~ <u>determines that the AUTHENTICATION REQUEST message contains a secure packet (as defined in ETSI TS 102 225 [SecPac] and sends this data to the UICC.</u>.

b) ~~If the list of preferred PLMN/access technology combinations is received and the check is successful in step 8a, then the UE proceeds as described in subclause 5.2.4.1.3. If the UE determines that there is a higher priority PLMN than currently camped chosen VPLMN, then the UE~~ shall respond with AUTHENTICATION FAILURE message indicating ~~VPLMN AMF to release the current N1 NAS signalling connection and abort the ongoing registration procedure before performing PLMN selection. If the current chosen PLMN is the highest priority PLMN, the UE shall respond with AUTHENTICATION RESPONSE message and may include a protected acknowledgement IE, if HPLMN requested it. If the indication included in an AV indicates a list of preferred PLMN/access technology combinations was provided by the HPLMN but no list is received; or if the list of preferred PLMN/access technology combinations is received but the security check is not successful in step 8a then the UE shall respond with AUTHENTICATION FAILURE message and proceeds as described in subclause 5.2.4.1.4.~~ <u>UE receives a</u>

TO FIG. 12B

FROM FIG. 12A

USAT command as defined in 3GPP TS 31.111 [x]. The USAT command indicates that the UE needs to perform PLMN selection or the USAT command indicates that the UE needs to release the N1 NAS signalling connection or the USAT command indicates that the UE needs to enter 5GMM-IDLE mode. The UE shall perform a PLMN selection per 3GPP TS 23.122, unless

- the UE initiated registration by sending REGISTRATION REQUEST message including an indication that the UE registers for emergency services; or

- the UE has determined that emergency services have been requested.

When the UE no longer requires emergency services, the UE shall perform a PLMN selection per 3GPP TS 23.122, due to having received the USAT command.

FIG. 12B

FROM FIG. 15A

FIG. 15B

Figure C.1.1: Procedure for providing list of preferred PLMN/access technology combinations 1) The UE (wherein a UE comprises of a ME and a UICC. A USIM is an example of a UICC) to the VPLMN AMF: The UE initiates registration by sending REGISTRATION REQUEST message to the VPLMN AMF;

2) The VPLMN AMF to the HPLMN UDM: The VPLMN AMF executes the registration procedure as defined in subclause 4.2.2.2.2 of 3GPP TS 23.502 [x]. As part of the registration procedure, the VPLMN AMF invokes Nudm_SDM_Get service operation message to the HPLMN UDM to get amongst other information the Access and Mobility Subscription data for the UE (see step 14b in subclause 4.2.2.2.2 of 3GPP TS 23.502 [x]);

3) If the subscription information indicates to send the HPLMN protected list of preferred PLMN/access technology combinations (or HPLMN protected indication of no change) due to change in registered PLMN and there is a change in the registered PLMN then HPLMN UDM shall provide the HPLMN protected list of preferred PLMN/access technology combinations (or HPLMN protected indication of no change) to the UE, otherwise the HPLMN UDM decides to provide the HPLMN protected list of preferred PLMN/access technology combinations (or HPLMN protected indication of no change) to the UE, based on operator policy;

4) The HPLMN UDM to the VPLMN AMF: The HPLMN UDM responds to the Nudm_SDM_Get service operation to the VPLMN AMF, which includes the HPLMN protected list of preferred PLMN/access technology combinations (or HPLMN protected indication of no change) within the Access and Mobility Subscription data. The Access and Mobility Subscription data type is defined in subclause 5.2.3.3.1 of 3GPP TS 23.502 [x]. If the HPLMN decided that the UE is to send a response, e.g. acknowledging successful security check (wherein the security check can comprise an integrity check or checking that the information element(s) that is/are expected in the message is received in the message) of the received HPLMN protected list of preferred PLMN/access technology combinations (or HPLMN protected indication of no change), the Nudm_SDM_Get response service operation also contains an indication that the UDM requests a response from the UE;

5) The VPLMN AMF to the HPLMN UDM: As part of the registration procedure, the VPLMN AMF also invokes Nudm_SDM_Subscribe service operation to the HPLMN UDM to subscribe to notification of changes of the received subscription data in previous step including notification of updates in the HPLMN list of preferred PLMN/access technology combinations included in the Access and Mobility Subscription data (see step 14c in subclause 4.2.2.2.2 of 3GPP TS 23.502 [x]);

6) The VPLMN AMF to the UE: The VPLMN AMF transparently sends the HPLMN protected list of preferred PLMN/access technology combinations (or HPLMN protected indication of no change) and the indication that the UDM requests a response from the UE (if included by HPLMN UDM) to the UE in the REGISTRATION ACCEPT message;

7) If the HPLMN protected list of preferred PLMN/access technology combinations is received and the security check is successful, then the UE shall replace the highest priority entries in the "Operator Controlled PLMN Selector with Access Technology" list stored in the UE with the received HPLMN protected list of preferred PLMN/access technology combinations, and

TO FIG. 15C

FROM FIG. 15B

FIG. 15C a) if the UE has a list of available PLMNs in the area and based on this list the UE determines that there is a higher priority PLMN than the currently camped chosen VPLMN and the chosen PLMN is not a user-preferred PLMN", then the UE may release the current N1 NAS signalling connection locally and abort the ongoing registration procedure before performing PLMN selection. If the chosen PLMN is a user-preferred PLMN", the UE may send a REGISTRATION COMPLETE as outlined in the steps below;

8) if:

a) the UE is configured to receive the HPLMN protected list of preferred PLMN/access technology combinations (or HPLMN protected indication of no change) due to change in registered PLMN, but neither the HPLMN protected list of preferred PLMN/access technology combinations nor the HPLMN protected indication of no change is received in the REGISTRATION ACCEPT message, or if the HPLMN protected list of preferred PLMN/access technology combinations (or HPLMN protected indication of no change) is received but the security check is not successful;

b) the current chosen VPLMN is not part of "User Controlled PLMN Selector with Access Technology" list and the UE is not in manual mode of operation; and c) the current chosen VPLMN is not lowest priority PLMN in available PLMN list;

then the UE shall release the current N1 NAS signalling connection locally and attempt to obtain service on a higher priority PLMN by acting as if timer T that controls periodic attempts has expired, with an exception that current PLMN is considered as lowest priority;

FIRST EMBODIMENT OF STEP 10

10) The UE to the VPLMN AMF: If the UDM has requested a response (the response comprising but not limited to an indication of "a successful security check of the received HPLMN protected list of preferred PLMN/access technology combinations or HPLMN protected indication of no change" or "a successful security check of the received HPLMN protected list of preferred PLMN/access technology combinations, but the chosen PLMN is a user-preferred PLMN" or "a unsuccessful security check of the received HPLMN protected list of preferred PLMN/access technology combinations, but the chosen PLMN is a user-preferred PLMN" or "a failed security check of the received HPLMN protected list of preferred PLMN/access technology combinations, but the chosen PLMN is a user-preferred PLMN", wherein the chosen PLMN is a user-preferred PLMN comprises the chosen PLMN is part of a "User Controlled PLMN Selector with Access Technology" list or the UE is in manual mode of operation) from the UE or the UE is configured to respond to the REGISTRATION ACCEPT and the UE a) verified that the HPLMN protected list of preferred PLMN/access technology combinations (or HPLMN protected indication of no change) has been provided by HPLMN in step 6, the UE sends REGISTRATION COMPLETE message to the serving AMF with a transparent container including the UE response; or b) is configured to receive the HPLMN protected list of preferred PLMN/access technology combinations (or HPLMN protected indication of no change) due to change in registered PLMN however the HPLMN protected list of preferred PLMN/access technology combinations nor the HPLMN protected indication of no change is received in the REGISTRATION ACCEPT message but the the current chosen VPLMN is part of "User Controlled PLMN Selector with Access Technology" list or the UE is in manual mode of operation then the UE sends REGISTRATION COMPLETE message to the serving AMF with a transparent container including the UE response with one or more of the following indications:

TO FIG. 15D

FROM FIG. 15C

FIG. 15D i) if the current chosen VPLMN is part of the "User Controlled PLMN Selector with Access Technology" list an indication that the current chosen VPLMN is part of the "User Controlled PLMN Selector with Access Technology" list
ii) if the UE is in manual network selection mode an indication that the UE is in manual network selection mode; or
iii) an indication that the security check failed.

SECOND EMBODIMENT OF STEP 10

10a) The UE to the VPLMN AMF: If the UDM has requested a response (the response comprising but not limited to an indication of "a successful security check of the received HPLMN protected list of preferred PLMN/access technology combinations or HPLMN protected indication of no change" or "a successful security check of the received HPLMN protected list of preferred PLMN/access technology combinations, but the chosen PLMN is a user-preferred PLMN" or "a unsuccessful security check of the received HPLMN protected list of preferred PLMN/access technology combinations, but the chosen PLMN is a user-preferred PLMN" or "a failed security check of the received HPLMN protected list of preferred PLMN/access technology combinations, but the chosen PLMN is a user-preferred PLMN", wherein the chosen PLMN is a user-preferred PLMN comprises the chosen PLMN is part of a "User Controlled PLMN Selector with Access Technology" list or the UE is in manual mode of operation) from the UE or the UE is configured to respond to the REGISTRATION ACCEPT and the UE's ME receives from the UICC the indication comprising "an unsuccessful security check of the received HPLMN protected list of preferred PLMN/access technology combinations" or "a failed security check of the received HPLMN protected list of preferred PLMN/access technology combinations" or the UE determines the HPLMN protected list of preferred PLMN/access technology combinations or HPLMN protected indication of no change is absent from the REGISTRATION ACCEPT, and:

i) if the current chosen VPLMN is part of the "User Controlled PLMN Selector with Access Technology" list; or
ii) if the UE is in manual network selection mode;

the UE includes a response in the SERVICE COMPLETE message and sends the SERVICE COMPLETE message. The response may be received by the UE"s ME from the UICC. The response maybe in the form of a secured packet. The response comprising an indication of the:

- HPLMN protected list of preferred PLMN/access technology combinations was not received, but the chosen PLMN is a user-preferred PLMN; or
- unsuccessful security check of the received HPLMN protected list of preferred PLMN/access technology combinations, but the chosen PLMN is a user-preferred PLMN; or
- a failed security check of the received HPLMN protected list of preferred PLMN/access technology combinations, but the chosen PLMN is a user-preferred PLMN.

FROM FIG. 15D

10b) The UE to the VPLMN AMF: If the UDM has requested response (the response comprising but not limited to an indication of "a successful security check of the received HPLMN protected list of preferred PLMN/access technology combinations or HPLMN protected indication of no change" or "a successful security check of the received HPLMN protected list of preferred PLMN/access technology combinations, but the chosen PLMN is a user-preferred PLMN" or "a unsuccessful security check of the received HPLMN protected list of preferred PLMN/access technology combinations, but the chosen PLMN is a user-preferred PLMN" or "a failed security check of the received HPLMN protected list of preferred PLMN/access technology combinations, but the chosen PLMN is a user-preferred PLMN", wherein the chosen PLMN is a user-preferred PLMN comprises the chosen PLMN is part of a "User Controlled PLMN Selector with Access Technology" list or the UE is in manual mode of operation) from the UE or the UE is configured to respond to the REGISTRATION ACCEPT and the UE's ME receives from the UICC the indication comprsing "a successful security check of the received HPLMN protected list of preferred PLMN/access technology combinations", and if the current chosen VPLMN is part of the "User Controlled PLMN Selector with Access Technology" list or the UE is in manual network selection mode, then the UE includes a response in the SERVICE COMPLETE message and sends the SERVICE COMPLETE message. The response may be received by the UE"s ME from the UICC. The response maybe in the form of a secured packet. The response comprising an indication of the:

- HPLMN protected list of preferred PLMN/access technology combinations was received, but the chosen PLMN is a user-preferred PLMN; or

- successful security check of the received HPLMN protected list of preferred PLMN/access technology combinations, but the chosen PLMN is a user-preferred PLMN.

DONE WITH EMBODIMENTS

11) The AMF to the UDM: The AMF sends a Nudm_SDM_Info request message. If a transparent container with a UE response was received in the REGISTRATION COMPLETE message, the AMF includes the transparent container in the Nudm_SDM_Info request message. If the HPLMN decided that the UE is to respond, e.g. acknowledge successful security check of the received HPLMN protected list of preferred PLMN/access technology combinations (or HPLMN protected indication of no change), in step 4, the UDM verifies that the response is provided by the UE. If the response is not provided to the UDM, then the UDM shall send a Nudm_UECM_DeregistrationNotification to the AMF.

The HPLMN needs to ensure that the UE is configured to receive the HPLMN protected list of preferred PLMN/access technology combinations (or protected indication of no change) due to change in registered PLMN, if the subscription information indicates to send the HPLMN protected list of preferred PLMN/access technology combinations (or protected indication of no change) due to change in registered PLMN. The HPLMN can configure the UE when not roaming. The UE configuration is preserved when UE changes RPLMN.

*Editor's note: In order to guarantee end-to-end security between HPLMN and roaming UEs, CT1 in close cordination with SA3 will work further on this procedure.*

FROM FIG. 15E

*Editor's note: The list of preferred PLMN/access technology combinations provided by HPLMN to VPLMN can be a secured packet(e.g. based on ETSI TS 102 225 V12.1.0: "Smart Cards; Secured packet structure for UICC based applications") or a plain non secured packet. It has to be decided by SA3, CT1 will align this aspect after SA3 defines the security mechanism.*

C.2   Stage-2 flow for steering of UE in VPLMN after registration.

The stage-2 flow for the steering of UE in VPLMN after registration is indicated in figure C.2.1.

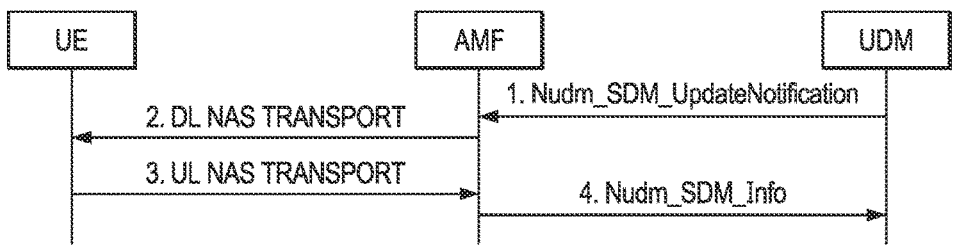

Figure C.2.1: Procedure for providing list of preferred PLMN/access technology combinations after registration

1. The UDM to the AMF: The UDM notifies the changes of the user profile to the affected AMF by the means of invoking Nudm_SDM_UpdateNotification service operation. The Nudm_SDM_UpdateNotification service operation contains the list of preferred PLMN/access technology combinations that needs to be delivery transparently to the UE over NAS within the Access and Mobility Subscription data. If the HPLMN decided that the UE is to acknowledge successful security check of the received list of preferred PLMN/access technology combinations, the Nudm_SDM_UpdateNotification service operation also contains an indication that the UDM requests an acknowledgement from the UE.

2. The AMF to the UE: the AMF sends a DL NAS TRANSPORT message to the served UE. The AMF includes in the DL NAS TRANSPORT message the transparent container received from the UDM. If the UE verifies that the list of preferred PLMN/access technology combinations included in the DL NAS TRANSPORT message is provided by HPLMN, the UE stores the list of preferred PLMN/access technology combinations.

*Editor's note: How the need for the UE to provide an acknowledgment is encoded in the DL NAS TRANSPORT is FFS.*

3. The UE to the AMF: if the UDM has requested an acknowledgement from the UE in the DL NAS TRANSPORT message and the UE verified that the list of preferred PLMN/access technology combinations has been provided by HPLMN, the UE sends an UL NAS TRANSPORT message to the serving AMF with a transparent container including the UE acknowledgement.

4. The AMF to the UDM: the AMF sends a Nudm_SDM_Info request message to the UDM. If a transparent container with a UE acknowledgement was received in the UL NAS TRANSPORT message, the AMF includes the transparent container in the Nudm_SDM_Info request message. If the HPLMN decided that the UE is to acknowledge successful security check of the received list of preferred PLMN/access technology combinations in step 1, the UDM verifies that the acknowledgement is provided by the UE.

*Editor's note: Further messages and further entities might be involved in order to secure the solution.*

US 11,438,755 B2

STEERING OF ROAMING IN WIRELESS COMMUNICATION NETWORKS

CROSS REFERENCE TO RELATED APPLICATION

This application is a continuation of and claims the benefit of priority to U.S. patent application Ser. No. 15/952,846, filed Apr. 13, 2018, which claims priority to U.S. Provisional Application No. 62/635,483, filed Feb. 26, 2018, the entire contents of which are hereby expressly incorporated by reference herein in its entirety.

TECHNICAL FIELD

This disclosure relates to roaming in wireless communication networks.

BACKGROUND

Steering of user equipment (UE) in a visited public land mobile network (VPLMN) is a procedure enabling a home public land mobile network (HPLMN) to update a list of preferred PLMN/access technology combinations at the UE via non-access stratum (NAS) signaling. The HPLMN updates the list of preferred PLMN/access technology combinations, e.g., depending on the public land mobile network (PLMN) where the UE is registered or when required by HPLMN operator policies. Steering of UE in VPLMN may also be known as steering of roaming (SOR). SOR enables a HPLMN to steer a user equipment (UE) from one network to another. SOR is a technique whereby a roaming UE is encouraged to roam to a preferred roamed-to network by the HPLMN. For example, a UE is registered on one public land mobile network (PLMN), and for some reason the UE's HPLMN wants the UE to register on another PLMN.

DESCRIPTION OF DRAWINGS

FIGS. 3A-3B illustrate a data flow diagram of an example registration procedure from 3GPP TS 23.502.

FIGS. 4A-4C illustrate an example description for including a device type indicator in a REGISTRATION REQUEST message, according to some implementations of the present disclosure.

FIG. 5 illustrates an example description for including a device type indicator in an Extensible Authentication Protocol (EAP) message, according to some implementations of the present disclosure.

FIGS. 8A-8E illustrate an example description of sending SOR data in EAP-Authentication and Key Agreement (AKA), according to some implementations of the present disclosure.

FIG. 9 illustrates an example description of a REFRESH command, according to some implementations of the present disclosure.

FIGS. 12A-12B illustrate an example description for the SOR procedure of FIG. 11, according to some implementations of the present disclosure.

FIGS. 15A-15F illustrate an example description for steering of UE in visited PLMN (VPLMN) during registration and after registration, according to some implementations of the present disclosure.

Like reference numbers and designations in the various drawings indicate like elements.

DETAILED DESCRIPTION

Figure 1:
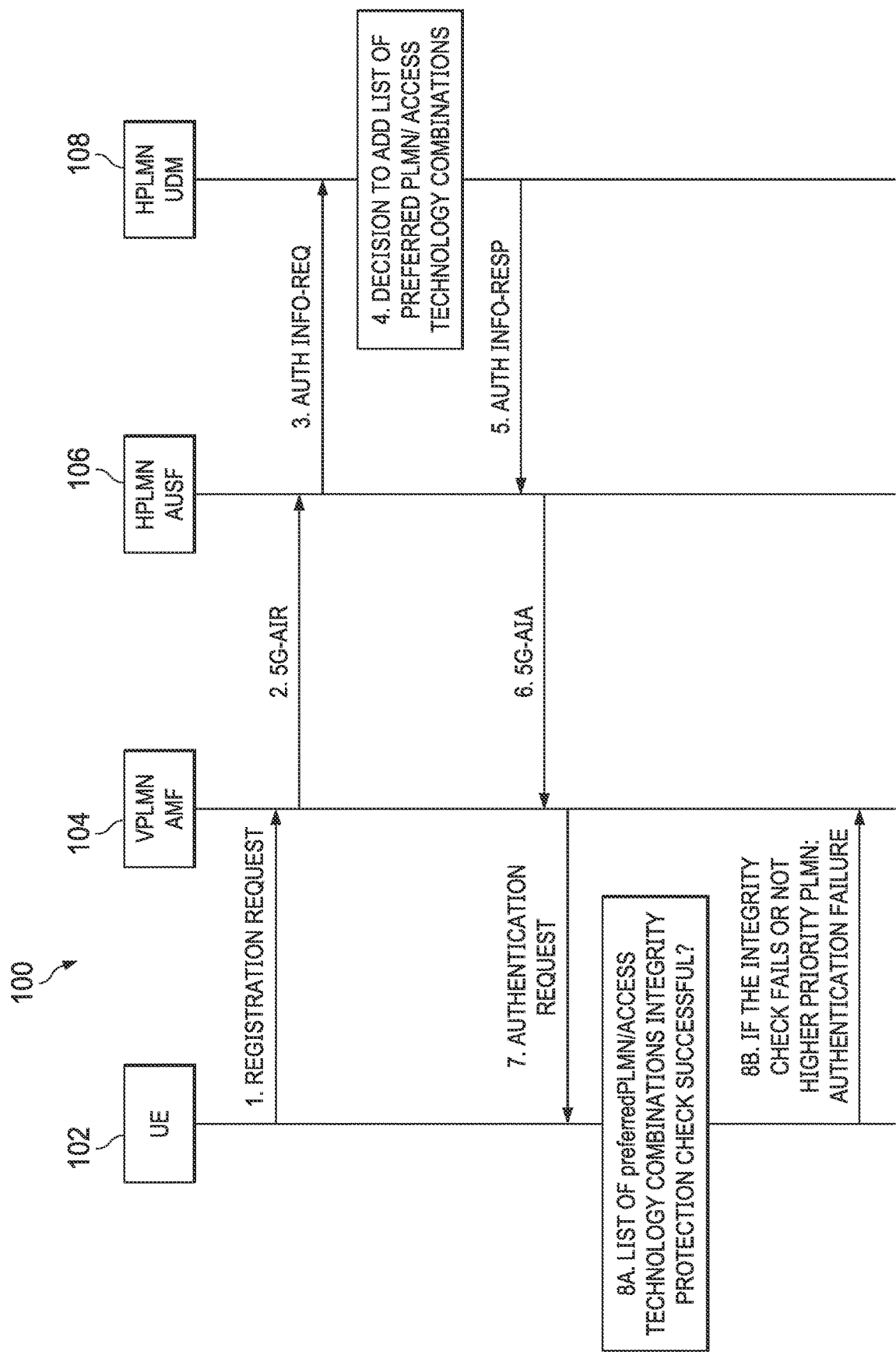
FIG. 1 is a data flow diagram illustrating an example process of using an authentication procedure to transport a list of preferred public land mobile network (PLMN) and access technology combinations.

The present disclosure is directed to steering of roaming (SOR) in wireless communication networks (i.e. steering of user equipment (UE) in visited public land mobile network (VPLMN)). In some wireless networks, such as fifth generation (5G) networks, a home operator (e.g., home public land mobile network (HPLMN)) can steer a UE from one network to another. For example, a UE is registered on one public land mobile network (PLMN), and the UE's HPLMN may want the UE to register on another PLMN.

A UE can perform a PLMN search to find an alternative PLMN. For example, when the UE first powers up, the UE can perform an initial PLMN search. After the UE powers up, the UE can perform the PLMN search periodically. The periodical PLMN search, for example, enables the UE to find a PLMN which has a higher priority than the UE's current PLMN (the PLMN that the UE is currently registered is also called the UE's VPLMN or Registered PLMN (RPLMN)). For example, the UE is on a VPLMN (2nd network) other than its HPLMN (1$^{st}$ network), and the UE can periodically search for the HPLMN. The periodical PLMN search can happen when a timer expires. An example of such a timer is a timer known as timer T. The PLMN search may only take place when the UE is in an IDLE mode, IDLE state, 5GMM-IDLE mode, or CM-IDLE state e.g. a state where there is no active communications taking place with the network. If the UE performed a PLMN search/selection in a CONNECTED mode, any connection would be lost as the radio would have to disconnect from the current PLMN. Therefore, if the timer T expires, the UE has to wait until the UE is in an idle mode to perform the PLMN search.

In some cases, such as in fourth generation (4G), third generation (3G), or second generation (2G) systems, once a UE has attached to a VPLMN, the HPLMN sends a Short Message (SM) including a secured packet (as defined in ETSI TS 102 225). This secured packet includes at least one PLMN identity. The SM is received by the Mobile Equipment (ME) of the UE, and based on an indication (e.g., code point) in the SM the ME determines that some or all of the contents of the SM is for the universal integrated circuit card (UICC) of the UE. The UICC then receives the SM and unpacks the SM to determine that it includes a secured packet. The content of the secured packet updates the Preferred Operator PLMN list (e.g., the most top entry) in the UICC, and the UICC sends a Universal Subscriber Identity Module (USIM) Application Toolkit (USAT) REFRESH command to the ME. Upon receipt of the REFRESH command, the ME reads the Preferred Operator PLMN list from the UICC or from the REFRESH command if a PLMN list was included, and stores the list in the memory of the ME. The ME then performs a PLMN search taking into account the PLMNs in the updated Preferred Operator PLMN list. The updated Preferred Operator PLMN list may have changed as a result of the secured packet. One will appreciate that the Preferred Operator PLMN list is an entry in the USIM application that can only be modified by the entity that has the necessary keys that allow modifications to be performed e.g. Home service provider, the HPLMN. However it could be any application that provides the functionality to the ME to indicate which networks should be chosen when the UE performs a PLMN selection.

In some cases, such as in 5G networks, an authentication procedure (which is part of a registration procedure) can be used to transport a list of networks or PLMNs (or a list of preferred PLMN and access technology combinations) to the UE. FIG. 1 is a data flow diagram 100 illustrating an example process of using an authentication procedure to transport a list of preferred PLMN and access technology combinations. The data flow diagram 100 is according to 3GPP CT1 contribution C1-180462 which is hereby incorporated by reference. The data flow diagram 100 includes a UE 102, a VPLMN access and mobility management function (AMF) node 104, an HPLMN authentication server function (AUSF) node 106, and an HPLMN unified data management (UDM) node 108. The UE 102 can include an ME and a (removable) memory module. An example of a memory module is a UICC. The UICC may include a subscriber identity module (SIM), a Universal SIM (USIM), or a Removable User Identity Module (R-UIM) which are collectively known as UICC applications. The ME and the UICC can use a set of commands, USAT commands defined in 3GPP TS 31.111 to exchange data and request each other to perform operations on behalf of the other entity. A UE may also be known as a mobile station (MS). The nodes 104, 106, and 108 can be core network components. The AMF can include access and mobility management functions such as registration management, connection management, mobility management, and access authentication and authorization. The AUSF can provide UE authentication services. The UDM can have similar functionalities as Home Location Register (HLR) or Home Subscriber Server (HSS), such as generating 3GPP Authentication and Key Agreement (AKA) authentication credentials. In this disclosure, access technology refers to radio access technology.

In FIG. 1, during steps 5-7 of the authentication procedure, the HPLMN UDM 108 can send SOR data (e.g., a list of preferred PLMN, a list of preferred PLMN and access technology combinations, or an HPLMN protected list of preferred PLMN/access technology combinations) to the UE 102. For example, if the HPLMN wants the UE to register on a different PLMN ($3^{rd}$ network), the HPLMN UDM 108 can send the SOR data. However, after the UE 102 receives the SOR data, the UE cannot perform a PLMN search because the UE is in a connected mode during the authentication phase (as discussed above, the PLMN search is performed when the UE is in an idle mode). In some cases, the timer T is not set until the UE completes the registration procedure. In other words, the timer T is started upon completion of the registration procedure, and the UE does not perform a PLMN search until the timer T expires. As a result, the UE 102 can be registered on an undesirable PLMN for a considerable amount of time. However, it is beneficial for an operator to steer (request the UE to perform a PLMN search) the UE to a different PLMN at its earliest convenience, for example, before the attach or registration attempt successfully completes. Further, a UE in the authentication phase cannot use the existing procedures of 2G, 3G, or 4G systems to receive a secured packet that includes the SOR data, because a UE cannot receive an SM if it is not attached or registered to a network.

Besides that, the UE may be on an undesirable PLMN for a long time, the SOR data delivery in FIG. 1 also has the following issues. First, in steps 5-7, the SOR data is sent in clear text to the UE 102. As a result, the SOR data can be modified by the VPLMN node 104. Second, the authentication procedure in 5G networks uses Extensible Authentication Protocol (EAP). In some cases, the data in the first EAP packet can be modified and even removed by the VPLMN node 104, and the receiving UE 102 and the sending HPLMN node 108 do not know that this has been done. Third, persistent information on the USIM or UICC may not be updated, causing the HPLMN to possibly send SOR data repeatedly. A UICC or USIM (e.g., memory module) contains persistent data or information. Persistent data refers to data stored in a memory which would not be rendered inaccessible or even wiped or cleared, upon, e.g., restart of the device or module within the device. For example, the ME reads, e.g., the data "Operator Controlled PLMN Selector with Access Technology" or other data from the USIM or UICC, e.g., after the ME boots or activated. The ME may read the data at other times, e.g. upon receiving the REFRESH command. The ME may modify the data "Operator Controlled PLMN Selector with Access Technology" based on the received SOR data, and the modification made by the ME should be synced to the USIM or UICC so that the persistent data is updated and the updates are available after, e.g., reboot, boot up or startup. However, write access to some UICC or USIM data, including the "Operator Controlled PLMN Selector with Access Technology", is protected as described earlier. Only the HPLMN operator has the credentials for the write access to this data. Neither the VPLMN nor the ME has these credentials. In other words, after receiving the SOR data, the ME in the UE 102 cannot update the persistent data on the UICC or USIM, which may cause the HPLMN to send SOR data repeatedly.

In some cases, a UE can be in a manual network selection mode. In the manual network selection mode, the UE selects a PLMN without necessarily considering the HPLMN's preferences. In an automatic network selection mode, the UE does consider the HPLMN's preferences when selecting a PLMN. In the case of manual network selection mode, SOR may not take place because the device has chosen a VPLMN or network per the UE's preferences. Another reason for a UE selecting a network or VPLMN is because the VPLMN is included in the "User Controlled PLMN Selector with Access Technology" list. For example, the UE finds a network on the "User Controlled PLMN Selector with Access Technology" list. The user/application has populated the "User Controlled PLMN Selector with Access Technology" list with PLMN entry(s) and it is akin to performing a manual network selection, i.e., the UE has chosen a network for a specific reason. Therefore, SOR may not take place if the UE has chosen a VPLMN and a network in the "User Controlled PLMN Selector with Access Technology" list.

In some cases, a UE can be battery constrained (or resource constrained). Because the PLMN search (e.g. network discovery process) consumes battery power and there is no guarantee that an alternative network is available, it is desirable that SOR operations take into account if a UE is battery constrained to prolong battery life. In some cases, a UE can be mobility constrained such as fixed UEs, and it may be desirable not to perform SOR because the PLMNs available to the UE are not likely to change.

The SOR procedure, according to methods and systems described herein, enables an operator to steer a UE to a different PLMN at the earliest convenience, e.g., before the attach or registration attempts successfully completes. The described approach uses a secured packet to deliver SOR data so that intermediate nodes along the path cannot modify the SOR data. The described approach can also update the persistent information on the UICC based on the SOR data. The described method also informs the PLMN if the UE will be unable to act on the SOR information due to the automatic network selection mode, user controlled PLMN selector list, or manual network selection mode. Another reason why the UE is unable to select a different PLMN is because the PLMN currently being registered continues to be the highest priority PLMN. Finally, the secured packet may fail an integrity check at the UICC. In any of these cases, the ME may be requested, via USAT, by the memory module to transmit a second secured packet to the network. The second secured packet may indicate to the network the reasons why the UE cannot select another PLMN or the integrity check failure. In some cases, a security check comprises an integrity check. In this disclosure, terms "security check" and "integrity check" can be interchangeable. Security check may also be determining by the ME or UICC that one to many information elements, indicators, SOR date or secured packet that should have been present (expected) in a received message are received in the received message. Determining could be based on configuration within the ME and or UICC.

5G terminologies used in this disclosure are described below.

5G system mobility management (5GMM)-IDLE mode: The term is used standalone. A UE in 5GMM-IDLE mode means the UE can be either in 5GMM-IDLE mode over 3GPP access or in 5GMM-IDLE mode over non-3GPP access.

5GMM-CONNECTED mode: The term is used standalone. A UE in 5GMM-CONNECTED mode means the UE can be either in 5GMM-CONNECTED mode over 3GPP access or in 5GMM-CONNECTED mode over non-3GPP access.

5GMM-IDLE mode over 3GPP access: AUE is in 5GMM-IDLE mode over 3GPP access when no N1 non-access stratum (NAS) signaling connection between the UE and network over 3GPP access exists. The term 5GMM-IDLE mode over 3GPP access used in this disclosure corresponds to the term Connection Management IDLE (CM-IDLE) state for 3GPP access used in 3GPP TS 23.501.

5GMM-CONNECTED mode over 3GPP access: A UE is in 5GMM-CONNECTED mode over 3GPP access when an N1 NAS signaling connection between the UE and network over 3GPP access exists. The term 5GMM-CONNECTED mode over 3GPP access used in the present document corresponds to the term CM-CONNECTED state for 3GPP access used in 3GPP TS 23.501.

5GMM-IDLE mode over non-3GPP access: AUE is in 5GMM-IDLE mode over non-3GPP access when no N1 NAS signaling connection between the UE and network over non-3GPP access exists. The term 5GMM-IDLE mode over non-3GPP access used in this disclosure corresponds to the term CM-IDLE state for non-3GPP access used in 3GPP TS 23.501.

5GMM-CONNECTED mode over non-3GPP access: A UE is in 5GMM-CONNECTED mode over non-3GPP access when it has an N1 NAS signaling connection between the UE and network over non-3GPP access exists. The term 5GMM-CONNECTED mode over non-3GPP access used in this disclosure corresponds to the term CM-CONNECTED state for non-3GPP access used in 3GPP TS 23.501.

Access stratum connection: A peer to peer access stratum connection between either the UE and the Next Generation-radio access network (NG-RAN) for 3GPP access or the UE and the N3IWF for non-3GPP access. The access stratum connection for 3GPP access corresponds to a radio resource control (RRC) connection via the Uu reference point. The creation of the access stratum connection for non-3GPP access corresponds to the completion of the IKE_SA_INIT exchange (see IETF RFC 7296) via the NWu reference point.

N1 NAS signaling connection: A peer to peer N1 mode connection between UE and AMF. An N1 NAS signaling connection is either the concatenation of an RRC connection via the Uu reference point and an NG connection via the N2 reference point for 3GPP access, or the concatenation of an IPsec tunnel via the NWu reference point and an NG connection via the N2 reference point for non-3GPP access.

5G PLMN search procedure is described as follows.

The PLMN search procedure for 5G is substantially identical to PLMN search procedures for PLMNs using EPC or GPRS core networks. As discussed above, a PLMN search happens initially and a PLMN search also happens periodically. The PLMN search that happens periodically occurs when a timer (e.g., the timer T discussed above) expires. The periodically happening PLMN search searches for a higher priority PLMN.

For example, 3GPP TS 23.122 provides the following description for the PLMN search procedure. If the MS is in a VPLMN, the MS shall periodically attempt to obtain service on its HPLMN (if the EHPLMN list is not present or is empty) or one of its EHPLMNs (if the EHPLMN list is present) or a higher priority PLMN/access technology combinations listed in "user controlled PLMN selector" or "operator controlled PLMN selector" by scanning in accordance with the requirements that are applicable to i), ii) and iii) as below. In the case that the mobile has a stored "Equivalent PLMNs" list the mobile shall only select a PLMN if it is of a higher priority than those of the same country as the current serving PLMN which are stored in the "Equivalent PLMNs" list. For this purpose, a value of timer T may be stored in the SIM. The interpretation of the stored value depends on the radio capabilities supported by the MS. The MS selects and attempts registration on other PLMN/access technology combinations, if available and allowable, in the following order: i) either the HPLMN (if the EHPLMN list is not present or is empty) or the highest priority EHPLMN that is available (if the EHPLMN list is present); ii) each PLMN/access technology combination in the "User Controlled PLMN Selector with Access Technology" data file in the SIM (in priority order); iii) each PLMN/access technology combination in the "Operator Controlled PLMN Selector with Access Technology" data file in the SIM (in priority order).

In addition to using the "Operator Controlled PLMN Selector" list, the device or UE can also use the "User Controlled PLMN Selector with Access Technology" list. If the device, when performing a PLMN search finds a PLMN that is in the "User Controlled PLMN Selector with Access Technology", then the device will choose this PLMN (with higher priority) than any PLMN in "Operator Controlled PLMN Selector".

Turning to a general description of the elements, a UE may be referred to as a mobile electronic device, user device, mobile station, subscriber station, portable electronic device, mobile communications device, wireless modem, wireless terminal, mobile equipment, session initiation protocol (SIP) user agent, set-top box, test equipment, or embedded modem. Examples of a UE may include a cellular phone, personal data assistant (PDA), smart phone, laptop, tablet personal computer (PC), pager, portable computer, portable gaming device, wearable electronic device, or other mobile communications device having components for communicating data via a wireless communication network. The wireless communication network may include a wireless link over at least one of a licensed spectrum and an unlicensed spectrum.

Other examples of a UE include mobile and fixed electronic devices. A UE may include a ME device and a removable memory module, such as a UICC that includes a SIM application, a USIM application, or an R-UIM application all known as UICC applications. The term "UE" can also refer to any hardware or software component that can terminate a communication session for a user. In addition, the terms "user equipment," "UE," "user equipment device," "user agent," "UA," "user device," and "mobile device" can be used synonymously herein. A UICC could also be a secure element that contains UICC applications that perform similar functionality.

The wireless communication network may include one or a plurality of radio access networks (RANs), other access networks such as fixed Ethernet or IEEE 802.11 WLAN, core networks (CNs), and external networks. The RANs may comprise one or more radio access technologies. The radio access technologies can be 3GPP access technologies or non-3GPP access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evolution (LTE), LTE-Advanced, or 5G access technologies. In some instances, the core networks may be evolved packet cores (EPCs) or 5G cores. The core networks may include AMF, Session Management Function (SMF), UDM, Authentication, Authorization, and Accounting (AAA) server, or other network nodes or entities.

Figure 2:
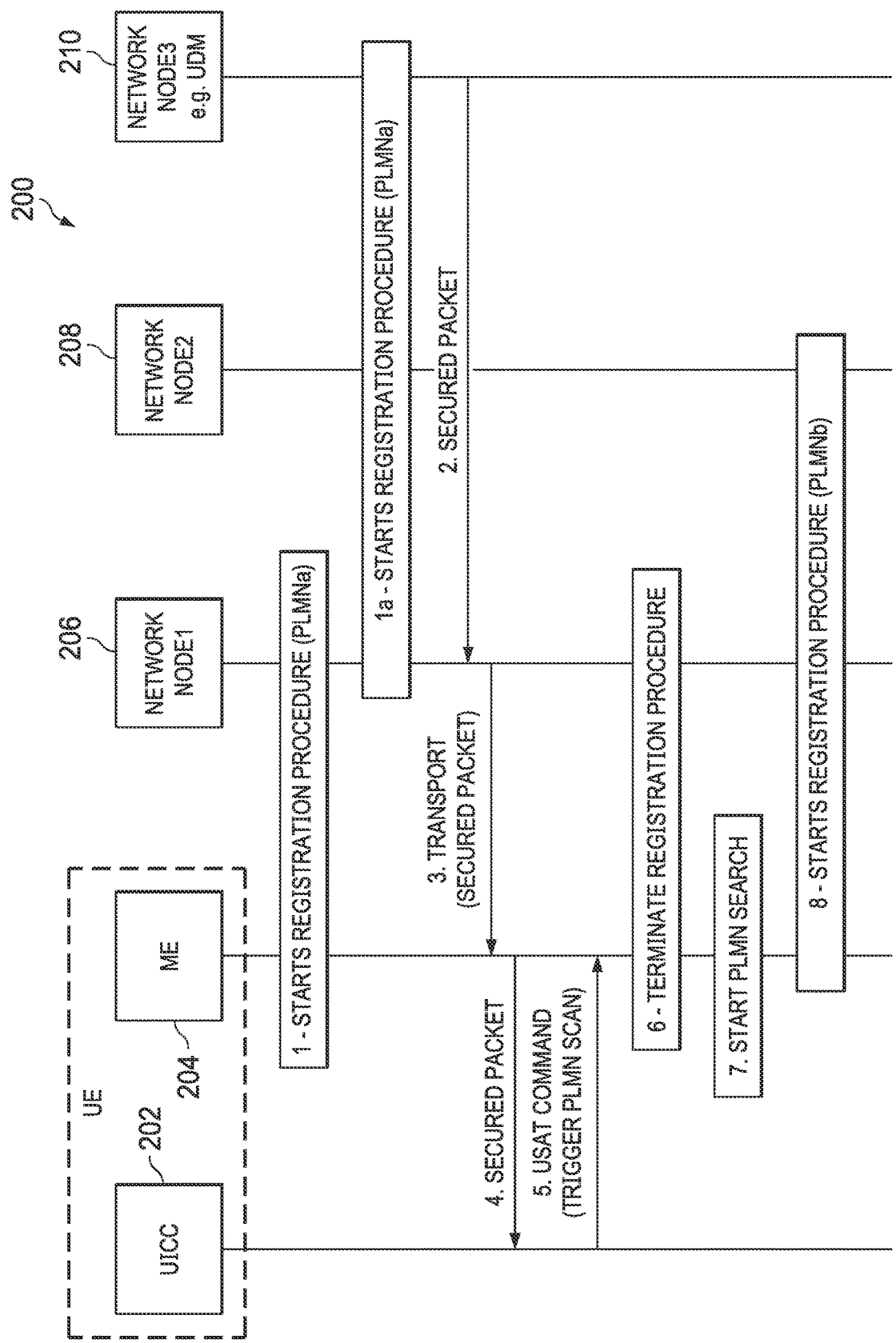
FIG. 2 is a data flow diagram illustrating an example steering of roaming (SOR) procedure, according to some implementations of the present disclosure.

FIG. 2 is a data flow diagram 200 illustrating an example SOR procedure, according to some implementations of the present disclosure. The data flow diagram 200 includes a UE having a UICC 202 and a ME 204, a first network node 206, a second network node 208, and a third network node 210. The first network node 206 can be an AMF or SMF node of a first VPLMN ($2^{nd}$ network), e.g., PLMNa. The second network node 208 can be an AMF or SMF node of a second VPLMN ($3^{rd}$ network), e.g., PLMNb. The third network node 210 can be a UDM node of an HPLMN ($1^{st}$ network).

At step 1, the ME 204 sends a message to the first network node 206 to start a registration/attach procedure with PLMNa. For example, the ME 204 can send a REGISTRATION REQUEST message to the first network node 206. In some cases, an N1 NAS signaling connection between the ME 204 and the first network node 206 can carry the REGISTRATION REQUEST message. The UE can use 3GPP access or non-3GPP access technologies. The N1 NAS signaling connection can be over 3GPP access or non-3GPP access. For example, the UE can be in a 5GMM-CONNECTED mode over 3GPP access, and an N1 NAS signaling connection over 3GPP access exists between the UE and first network node 206.

At step 1a, the first network node 206 forwards the message in step 1 (e.g., the REGISTRATION REQUEST) to the third network node 210 in HPLMN. The first network node 206 can forward the message to the third network node 210 without going through the second network node 208. In some cases, as will be discussed in FIGS. 3A-5, the messages of steps 1 and 1a can include an indication that indicates the type of device (e.g., battery constrained or mobility constrained) and the operating mode (e.g., manual network selection mode). This indication can help the third network node 210 in HPLMN to determine whether to send SOR data to the UE. For example, if the UE is battery constrained, mobility constrained, or in a manual network selection mode, a node within the HPLMN (e.g. third network node) may not send SOR data to the UE.

At step 2, the third network node 210 sends a secured packet to the first network node 206. The secured packet can include SOR data. At step 3, as will be discussed in FIGS. 6-8E, the first network node 206 sends the secured packet received in step 2 to the ME 204. In other words, the secured packet is received during the registration/attach procedure. In some cases, in step 3, the secured packet is received in a DL NAS TRANSPORT message. In some other implementations, step 3 can be a REGISTRATION ACCEPT message or an ATTACH ACCEPT message including the SOR data or the secured packet. In some cases, EAP is used for the authentication procedure in the registration procedure (e.g., 5G networks use EAP for authentication), and the secured packet can be received in an EAP message. In some cases, the secured packet can be packets in a SM, and hence "secured packet" can be interchanged with "SM containing a secured packet".

At step 4, the ME 204 determines by an indication (e.g., code point) in the message received at step 3 that the content is for the UICC, and the ME 204 sends the secured packet to the UICC 202. The UICC 202 decodes the secured packet and retrieves the SOR data. In some cases, during steps 2-4, the secured packet is encoded by the third network node 210 in HPLMN and decoded by the UICC 202, while the intermediate entities such as the first network node 206 and the ME 204 do not decode the secured packet. Based on the SOR data, the UICC 202 can make decisions whether to trigger PLMN search.

At step 5, the ME 204 receives an indication from the UICC 202. The indication can indicate the ME 204 to terminate the ongoing registration/attach procedure and trigger a PLMN search. In some cases, the indication from the UICC 202 can be received via a USAT command. The USAT command can be a REFRESH command. The REFRESH command can include an indication that an SOR procedure should be initiated. In some cases, as will be discussed in FIG. 9, the REFRESH command at step 5 can optionally contain a list of preferred PLMNs so that the ME 204 can perform the PLMN search based on the list. In some cases, the REFRESH command does not contain the list of preferred PLMNs, and the REFRESH command triggers the ME 204 to download an environment file from the UICC 202 that includes a list of preferred PLMNs. The ME 204 then performs the PLMN search based on the downloaded list.

At step 6, based on the indication in step 5, the ME 204 can terminate the registration/attach procedure with PLMNa. In some cases, for terminating the registration/attach procedure, the ME 204 can release the N1 NAS signaling connection between the ME 204 and the first network node 206. In some cases, the termination of the registration/attach procedure includes the ME 204 sending an authentication failure message or a REGISTRATION COMPLETE message to the first network node 206. The authentication failure message or the REGISTRATION COMPLETE message can include an indicator, either indicating a failed receipt of the secured packet (e.g., the secured packet failed an integrity check as discussed below), a successful receipt of the secured packet, or indicating that the ME will not perform a PLMN search with an optional qualification for the reason why. The indicator indicating failure can prevent the network (e.g., PLMNa) from retransmitting a registration procedure related message. The indication indicating failure could be further qualified to indicate the actual reason, examples being but not limited to: PLMN search, PLMN temporary not allowed etc. When the indicator indicates a successful receipt, the indicator identifies to the network that the secured packet was successfully received and the ME will perform a PLMN search. When the indicator indicates that the ME will not perform a PLMN search, the indicator may be qualified indicating the reason: ME is in a manual network selection mode, VPLMN (RPLMN) is on the User controlled PLMN list, there are no other available PLMNs, PLMN temporary not allowed etc.

At step 7, the ME 204 can start the PLMN search to find an alternative network (e.g., PLMNb) to attach or register. At step 8, the ME 204 starts the registration/attach procedure with PLMNb.

In some cases, after the ME 204 receives the USAT command in step 5, if the ME is a device type of at least one of but not limited to battery constrained, resource constrained, mobility constrained, or the ME has selected a network (RPLMN) because that network was in the User controlled PLMN list (i.e., that network is a user-preferred PLMN), the ME 204 does not perform the PLMN search until when either the periodical PLMN search timer T expires or when the ME 204 performs a PLMN search for other reasons. In some cases, when the ME 204 receives the USAT command in step 5, if the UE is in a manual network selection mode or the ME has selected a network (RPLMN) because that network was in the User controlled PLMN list, the UE refrains from performing a PLMN search. The User controlled PLMN list is also called "User Controlled PLMN Selector with Access Technology" list. In some cases, the ME 204 can inform the network (e.g., a node of the HPLMN (e.g., third network or third network's node)) that it is in a manual network selection mode or the ME has selected a network (RPLMN) because that network was in the User controlled PLMN list so that a node of the HPLMN (third network node) does not send SOR data.

In some cases, the indication received from the UICC 202 in step 5 indicates that the secured packet failed an integrity check at the UICC. The indication that the secured packet failed the integrity check may cause the ME 204 to remove the PLMN with which the UE is attempting to register (e.g., PLMNa) from the "Operator Controlled PLMN Selector with Access Technology" list stored in the ME 204 and optionally include PLMNa in a forbidden PLMN list (e.g. $EF_{FPLMN}$ (Forbidden PLMNs)). In some cases, if the current registration/attach procedure with PLMNa is for emergency services, the UE starts the PLMN search after there is no longer a need for emergency services. In some implementations, in step 6, the ME may send a message, e.g., a REGISTER COMPLETE message or an ATTACH COMPLETE message, to the network containing an indication indicating that the secured packet failed the integrity/security check, that the VPLMN is on the User controlled PLMN list or that the ME is in a manual network selection mode. The sending of the message may be dependent on the ME being configured to respond (e.g., the ME is configured to respond the REGISTRATION ACCEPT/ATTACH ACCEPT message in step 3). This configuration may be stored in an Open Mobile Alliance (OMA) device management (DM) file in the ME, read from the UICC and then stored in the ME, or could have been received in the REGISTRATION ACCEPT/ATTACH ACCEPT message in step 3. In some cases, the ME is configured to expect to receive SOR data in the REGISTRATION ACCEPT/ATTACH ACCEPT message in step 3 e.g. either as indication in the REGISTRATION ACCEPT/ATTACH ACCEPT message in step 3 or as an indication in the SOR data or secured packet that was in the REGISTRATION ACCEPT/ATTACH ACCEPT message in step 3. This configuration may be stored in the OMA DM file in the ME, or read from the UICC and then stored in the ME.

In some case, if the UE is in a manual network selection mode, the following procedure can be performed:

1. The ME starts registration/attach procedure with a VPLMN.
2. The ME receives a first secured packet including SOR data from, e.g., UDM in HPLMN.
3. The UE determines that it is in a manual network selection mode.
4. The ME sends the first secured packet to the UICC along with an indication that the UE is in a manual network selection mode.
5. The ME receives a second secured packet from the UICC, where the second secured packet includes an indication that the ME is in a manual network selection mode.
6. The ME can optionally send to the network the second secured packet (e.g., HPLMN) and optionally include an indication that the ME is in a manual network selection mode so that the HPLMN does not send SOR data. In some cases, the ME can continue the current registration/attach procedure with the VPLMN.

In some cases, if the UE is in a manual network selection mode or the UE selected a PLMN that was in the User controlled PLMN list, the following procedure can be performed:

1. The ME starts registration/attach procedure with a VPLMN.
2. The ME receives a secured packet including SOR data from, e.g., UDM in HPLMN. For example, the secured packet can be received using EAP as shown in FIGS. 6-8E.
3. The ME sends the secured packet to the UICC.
4. The ME receives an indication from the UICC to perform a PLMN search. For example, the USAT REFRESH command from the UICC can include an indicator to perform a PLMN search.
5. Because the ME is in a manual network selection mode or the UE selected a PLMN that was in the User controlled PLMN list, the ME decides not to perform the PLMN search and continues the current registration/attach procedure with the VPLMN. For example, the ME can send an EAP response message to the network, where the EAP message, e.g., EAP-response, may contain an indication why the ME is continuing with the PLMN search, e.g., in the manual network selection mode, or UE used the User controlled PLMN list.

In this disclosure, the described approach for the case when the UE is in a manual network selection mode is also applicable to the case when the ME selected a network (PLMN) in the "User Controlled PLMN Selector with Access Technology" list.

Figure 3A:
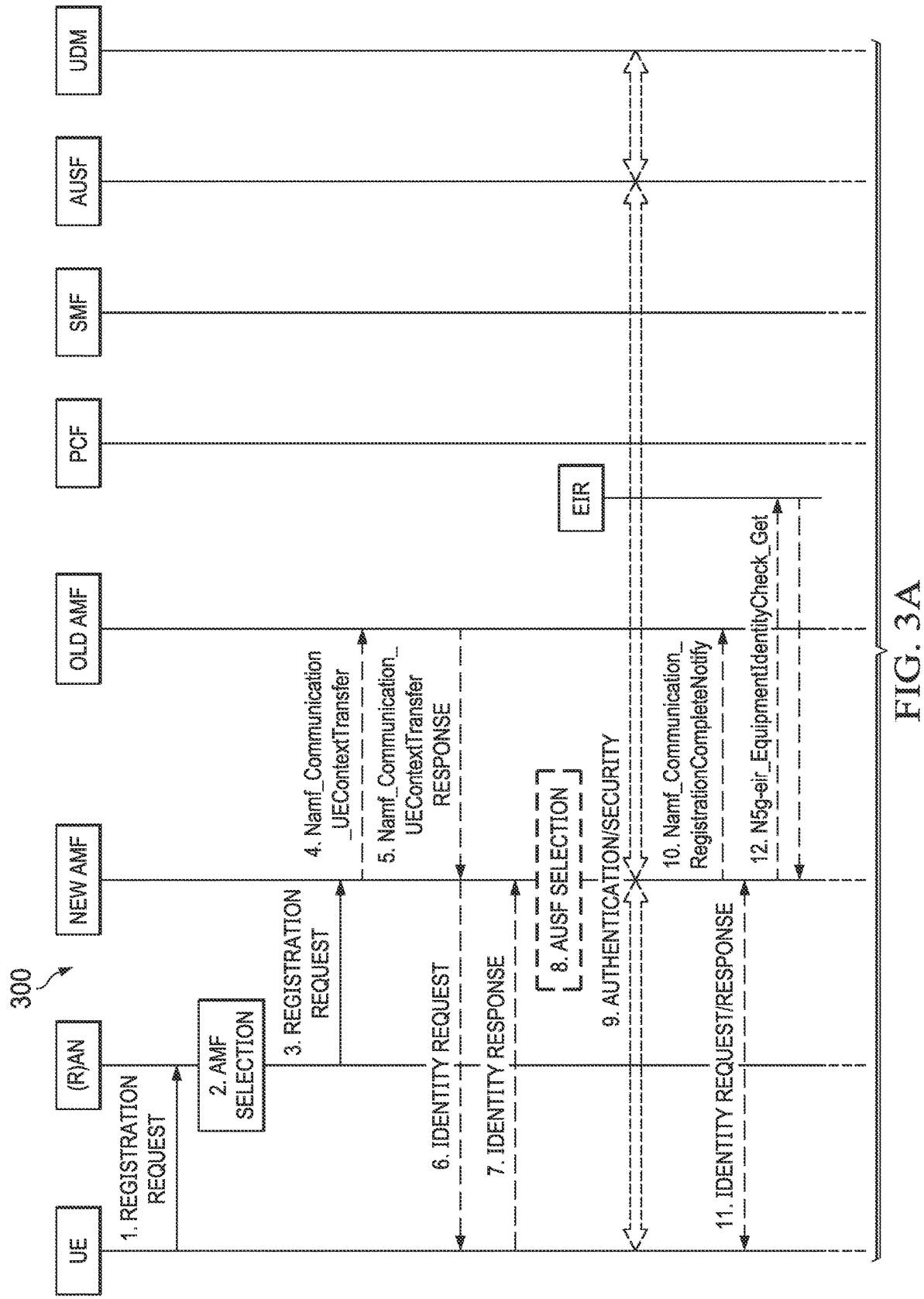

As discussed above, in step 1 of FIG. 2 the ME can indicate the device type (e.g., battery constrained, mobility constrained device, and in a manual network selection mode). FIGS. 4A-5 describes two methods for indicating the device type. FIGS. 3A-3B illustrate a data flow diagram 300 of an example registration procedure from 3GPP TS 23.502. FIGS. 4A-4C illustrate including the device type indicator in a REGISTRATION REQUEST message (e.g., step 1 of FIG. 3A), while FIG. 5 illustrates including the device type indicator in an EAP message (i.e., step 9 of FIG. 3A).

FIGS. 4A-4C illustrate an example description for including a device type indicator in a REGISTRATION REQUEST message, according to some implementations of the present disclosure. For example, the registration initiation procedure described in 3GPP TS 24.501 can be modified to include the underlined text shown in FIGS. 4A-4C. Table 8.2.5.1.1 in FIG. 4B and Table 9.8.2.2.1 in FIG. 4C illustrate that the REGISTRATION REQUEST message can include a new information element "device type" to indicate whether the UE is a battery or resource constrained device, a mobility constrained device, and/or in a manual network selection mode. In some implementations, the setting of the battery constrained indicator can change if the device is connected to a power supply, as such the ME might send a mobility management message including the device type. One skilled in the art will appreciate that in this disclosure message names, code point names, etc. are used for illustrative purposes, and other message names and code point names can be used. For example, indicators can be sent using new information elements or extending existing information elements. In this disclosure, occurrences of "shall" could be "may" or "should".

FIG. 5 illustrates an example description for including a device type indicator in an EAP message, according to some implementations of the present disclosure. For example, 3GPP TS 24.302 can be modified to include the underlined text shown in FIG. 5. Table 8.2.X.1-1 in FIG. 5 shows that an EAP-Response/AKA'-Challenge message can include an AT_SORInfo_Request attribute containing the device type indicator.

As discussed above, in step 2-3 of FIG. 2 the HPLMN (e.g., UDM) can send the secured packet including SOR data to the UE. FIGS. 6-8E describe methods for sending the SOR data.

Figure 6:
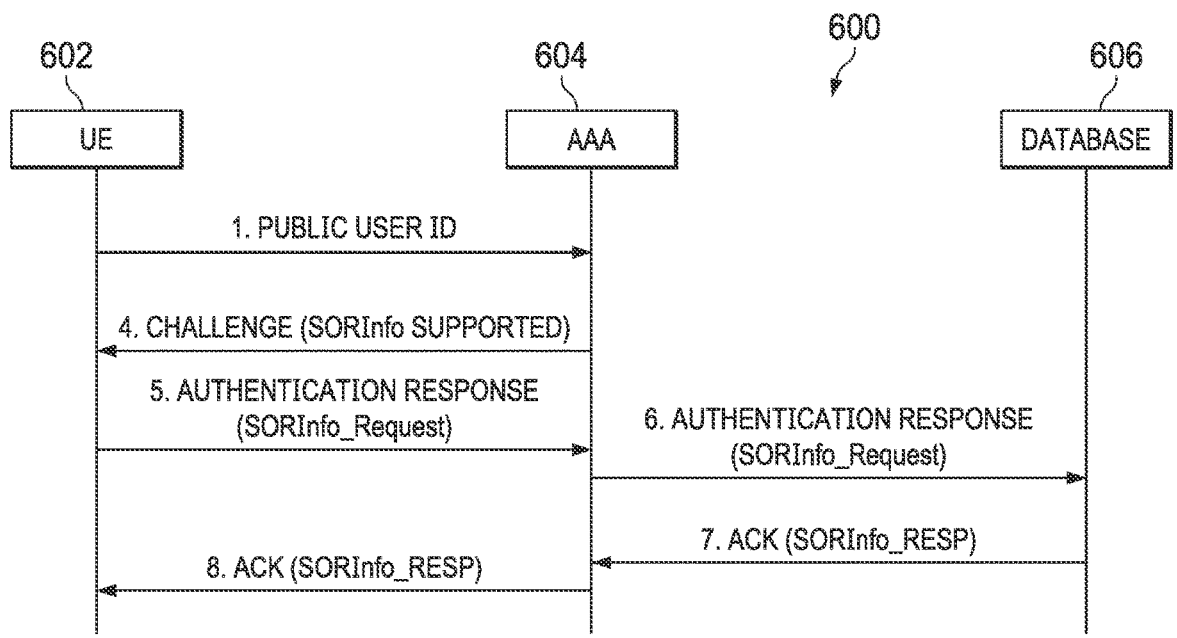
FIG. 6 is a data flow diagram illustrating an example procedure using EAP signaling to send SOR data, according to some implementations of the present disclosure.

FIG. 6 is a data flow diagram 600 illustrating an example procedure using EAP signaling to send SOR data, according to some implementations of the present disclosure. The data flow diagram 600 includes a UE 602, an AAA server 604 in a VPLMN, and a database or UDM 606 in HPLMN. The AAA server 604 can also be replaced with AMF and/or UDM. At step 4, the AAA server 604 in VPLMN sends an authentication challenge to the UE 602. The authentication challenge can include an AT_SORInfo_Request_Supported attribute (described in section 8.2.X.1 in FIG. 8C) indicating that the AAA server 604 supports the UE 602 requesting SOR data. At step 5, in response to receiving the indicator that the AAA server 604 supports the UE 602 requesting SOR data, the UE 602 sends an authentication response to the AAA server 604, where the authentication response includes an AT_SORInfo_Request attribute (described in section 8.2.X.2 in FIG. 8E) indicating that the UE 602 requests SOR data, optionally if the UE is battery constrained or operating in manual network selection mode. At step 6, the AAA server 604 forwards the authentication response to the database 606 in HPLMN. The authentication response in step 6 also includes the AT_SORInfo_Request attribute indicating that the UE 602 requests SOR data. The UDM/HSS/HLR takes into account the operating mode of the UE and if it is battery constrained. At step 7, in response to receiving the indicator indicating that the UE 602 requests SOR data, the database 606 in HPLMN sends an authentication acknowledgement to the AAA server 604, where the authentication acknowledgement includes an AT_SORInfo_RESP attribute (described in section 8.2.X.3 in FIGS. 8D-8E) that contains the SOR data. At step 8, the AAA server 604 forwards the authentication acknowledgement to the UE 602. The authentication acknowledgement in step 8 also includes the AT_SORInfo_RESP attribute containing the SOR data.

Figure 7:
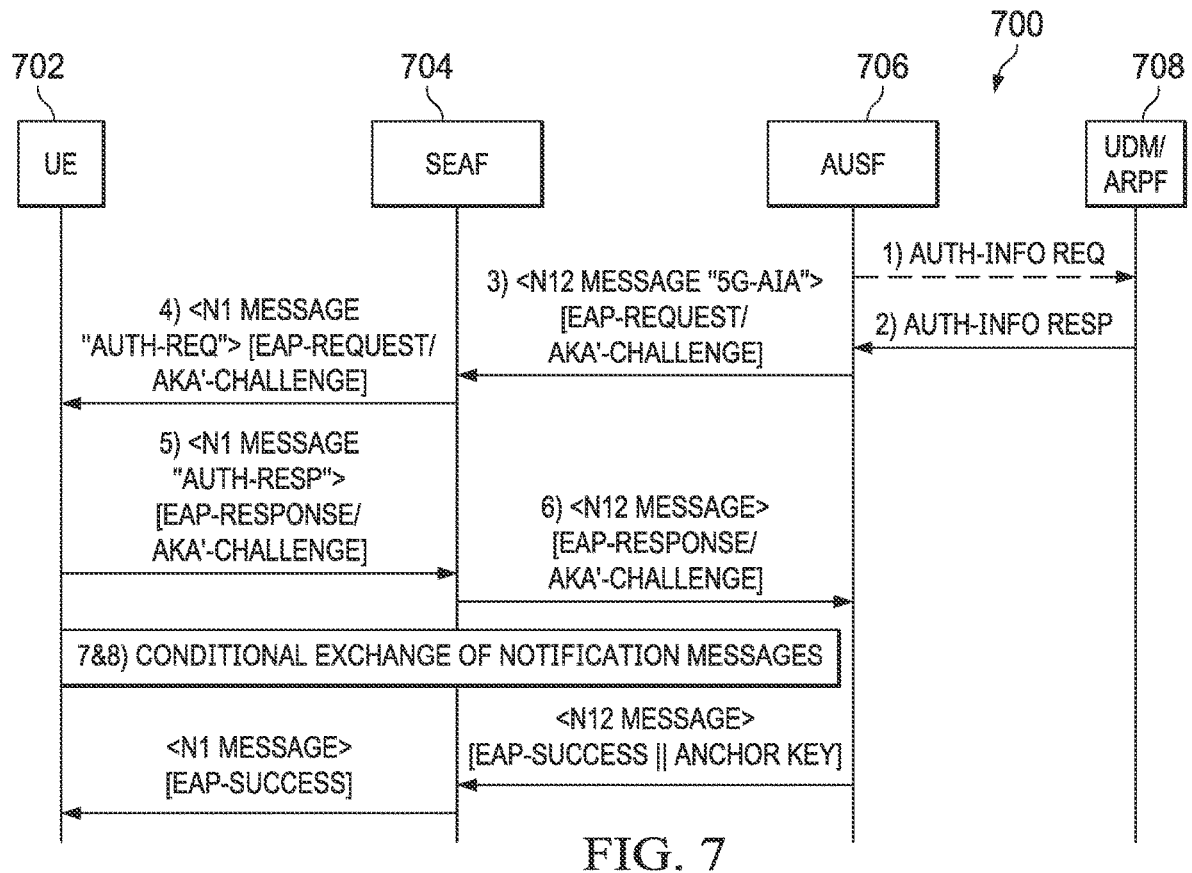
FIG. 7 is a data flow diagram illustrating an example process using EAP signaling for obtaining SOR data in fifth generation (5G) networks, according to some implementations of the present disclosure.

FIG. 7 is a data flow diagram 700 illustrating an example process using EAP signaling for obtaining SOR data in 5G networks, according to some implementations of the present disclosure. The example process is also applicable to other EAP framework methods, e.g., EAP methods used to access wireless local area networks (WLANs), where the names of the functions can be different. The data flow diagram 700 includes a UE 702, an Security Anchor Functionality (SEAF) or AMF node 704 in a VPLMN, a Authentication Server Function (AUSF) node 706 in an HPLMN, and a UDM/Authentication credential Repository and Processing Function (ARPF) node 708 in the HPLMN. Similar to FIG. 6, at step 4 of FIG. 7, the EAP-Request/AKA'-Challenge can include the AT_SORInfo_Request_Supported attribute indicating that the SEAF/AMF 704 supports the UE 702 requesting SOR data. At steps 5 and 6 of FIG. 7, the EAP-Response/AKA'-Challenge can include the AT_SORInfo_Request attribute indicating that the UE 702 requests SOR data. The messages in steps 7 and 8 of FIG. 7 can include the AT_SORInfo_RESP attribute containing the SOR data. In some cases, a decision to send an indication that SOR is supported in step 2 and/or 3 is based upon the network and/or the location that the UE has requested to register on. In some cases, the data sent in step 7 could be sent in step 3.

FIGS. 8A-8E illustrate an example description of sending SOR data in EAP-AKA', according to some implementations of the present disclosure. For example, 3GPP TS 24.302 can be modified to include the underlined text shown in FIG. 8.

In some cases, at step 5 in FIG. 2, the ME can receive a USAT REFRESH command from the UICC. The REFRESH command can optionally contain a list of PLMNs for 5G access technology (e.g. NG or E-UTRAN connected to 5G core network), or a PLMN-with-access-technology (PLMN-wAct) list containing access technology selector including radio access technologies (RATs) used to determine to perform the 5G SOR procedure or steering of a UE from one VPLMN to another VPLMN.

FIG. 9 illustrates an example description of a REFRESH command, according to some implementations of the present disclosure. For example, 3GPP TS 31.111 can be modified to include the underlined text shown in FIG. 9 so that the REFRESH command includes two new parameters "(5G) PLMN List" and "(5G) PLMNwAcT list". In some cases, the PLMN list and the PLMNwAcT list can define the preferred PLMNs in a priority order. The ME can obtain the PLMN list or the PLMNwAcT list from the REFRESH command, and performs the PLMN search based on the list, e.g., starting from the highest priority PLMN.

Figure 10:
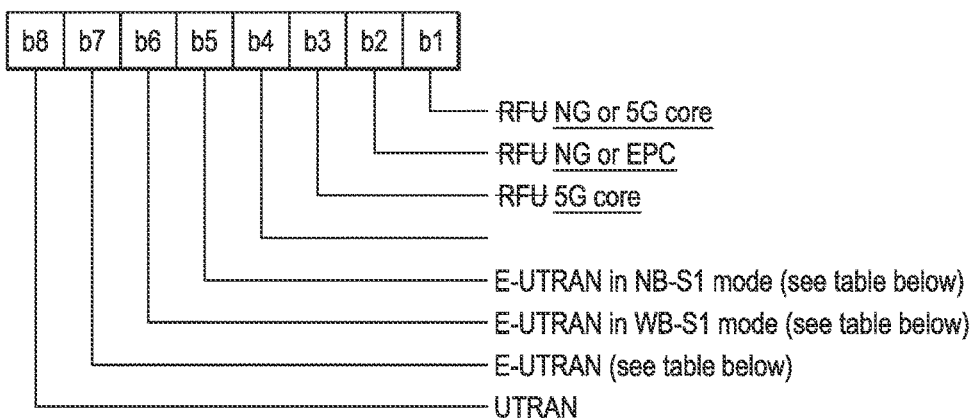
FIG. 10 illustrates an example description of an environment file (EF) for data "Operator controlled PLMN selector with Access Technology", according to some implementations of the present disclosure.

FIG. 10 illustrates an example description of an environment file (EF) for data "Operator Controlled PLMN Selector with Access Technology", according to some implementations of the present disclosure. For example, 3GPP TS 31.102 can be modified as shown in FIG. 10 to indicate three different embodiments, i.e., 5G System (5GS) supported by New Radio (NR) access, 5G System (5GS) supported by E-UTRA, or EPS (EPC supported by E-UTRA). In some cases, the EF file $EF_{OPLMNwACT}$ is on the UICC and includes preferred PLMNs in a priority order. The REFRESH command can trigger the ME to download $EF_{OPLMNwACT}$ to the memory of the ME so that the ME can perform the PLMN search based on the preferred PLMNs, e.g., starting from the highest priority PLMN.

In some cases, the 5G SOR procedure or steering of a UE from one VPLMN to another VPLMN may involve terminating the ongoing registration procedure by at least one of a REGISTRATION COMPLETE message, an authentication failure message, or releasing the N1 NAS signaling connection.

In some cases, upon the UE (or ME, UE and ME can be interchangeable in this disclosure) terminating the ongoing registration procedure, the UE continues operations as if the UE was switched on or the UE was recovered from lack of coverage, and the UE selects the highest priority PLMN that is available. Alternatively, upon the UE terminating the ongoing registration procedure, the UE selects the highest priority PLMN or equivalent highest priority PLMN (if it is available) using all access technologies via which it had previously discovered the previously highest priority PLMN. Upon failing to discover a higher priority PLMN than the previously highest priority PLMN, the UE using all access technologies that the UE is capable of and if necessary to discover a higher priority PLMN.

As an alternative, if the UE is either battery constrained or the network was selected because the UE is operating in manual network selection mode or the UE had selected a PLMN from the user controlled PLMN list, the ME can ignore the REFRESH command but use the updated Preferred Operator PLMN list that has been read into the ME's memory when the ME performs a PLMN search, e.g., because the periodical search timer T expired. The ME continues operations as if the ME was switched on or the ME has lost PLMN coverage.

Figure 11:
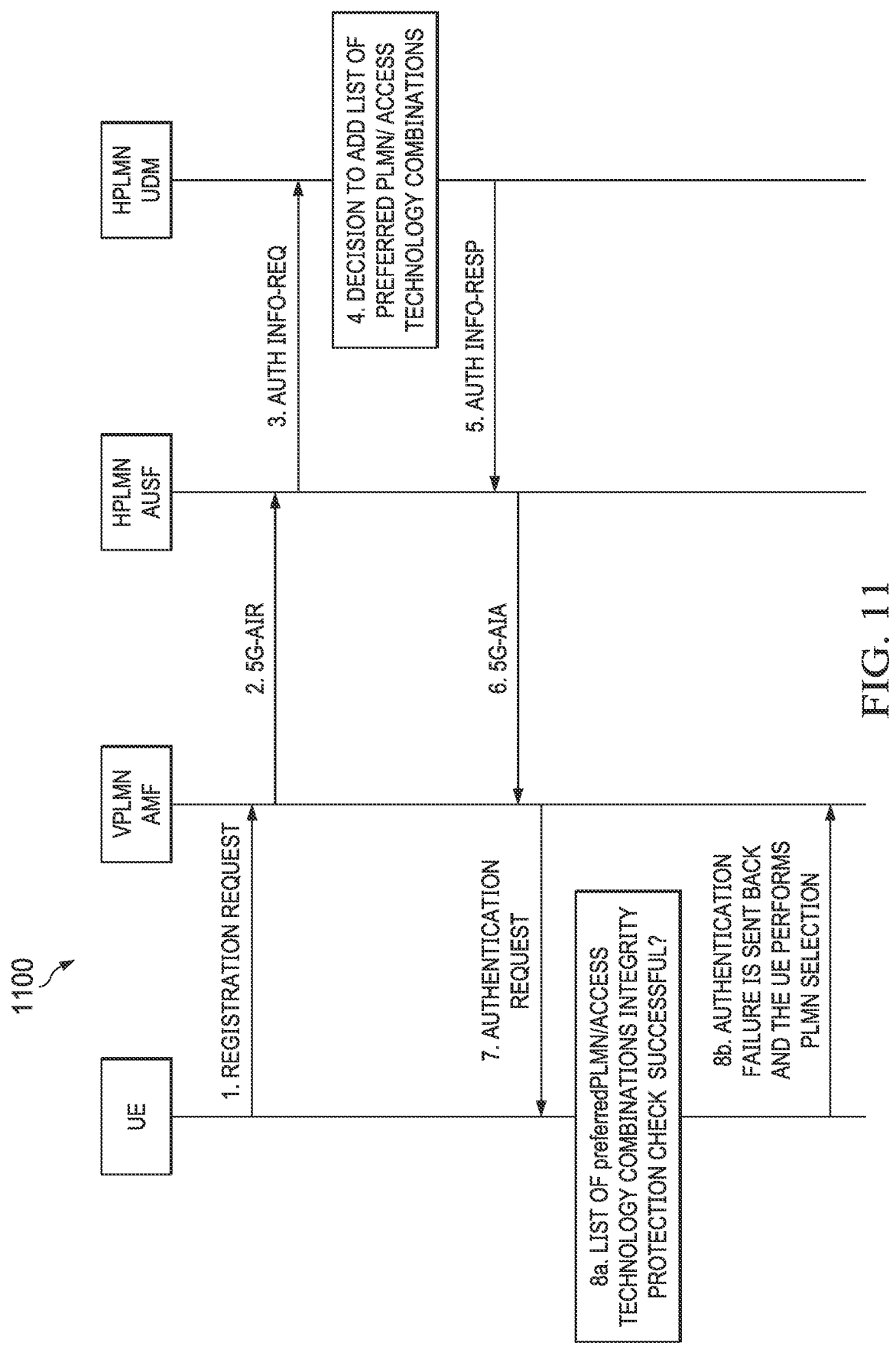
FIG. 11 is a data flow diagram illustrating an example SOR procedure, according to some implementations of the present disclosure.

FIG. 11 is a data flow diagram 1100 illustrating an example SOR procedure, according to some implementations of the present disclosure. The data flow diagram 1100 modifies the procedure in FIG. 1 based on the described approaches in the present disclosure. FIGS. 12A-12B illustrate an example description for the SOR procedure of FIG. 11, according to some implementations of the present disclosure. FIGS. 12A-12B show changes to the 3GPP CT1 contribution C1-180462.

FIGS. 15A-15F illustrate an example description for steering of UE in VPLMN during registration and after registration, according to some implementations of the present disclosure. The example description in FIGS. 15A-15F can be included in 3GPP TS 23.122. Message 6 in figure C.1.1 of FIGS. 15A-15B (i.e., REGISTRATION ACCEPT) can be in step 3 of FIG. 2. Message 10 in figure C.1.1 of FIGS. 15A-15B (i.e., REGISTRATION COMPLETE) can be in step 6 of FIG. 2.

In some cases, if the SOR data (e.g., the secured packet including the HPLMN protected list of preferred PLMN/ access technology combinations) is successfully received (e.g., successful security check), and if the VPLMN the ME is currently attempting to register is not a user-preferred PLMN and the ME is not in a manual selection mode, the ME may terminate the current registration procedure and perform a PLMN search based on the SOR data e.g. after completion of the REGISTRATION/ATTACH procedure (step 10) or before in any of steps 7-9. In some cases, if the SOR data is successfully received, and if the VPLMN the ME is currently attempting to register is a user-preferred PLMN or the ME is in a manual selection mode, the ME may continue the current registration procedure and not to perform the PLMN search. In some cases, if the SOR data is not successfully received (e.g., fails security check, or the ME is configured to receive the SOR data but did not receive), and if the VPLMN the ME is currently attempting to register is not a user-preferred PLMN and the ME is not in a manual selection mode, the ME may terminate the current registration procedure and perform a PLMN search. In some cases, if the SOR data is not successfully received, and if the VPLMN the ME is currently attempting to register is a user-preferred PLMN or the ME is in a manual selection mode, the ME may continue the current registration procedure and not to perform the PLMN search.

Figure 15A:
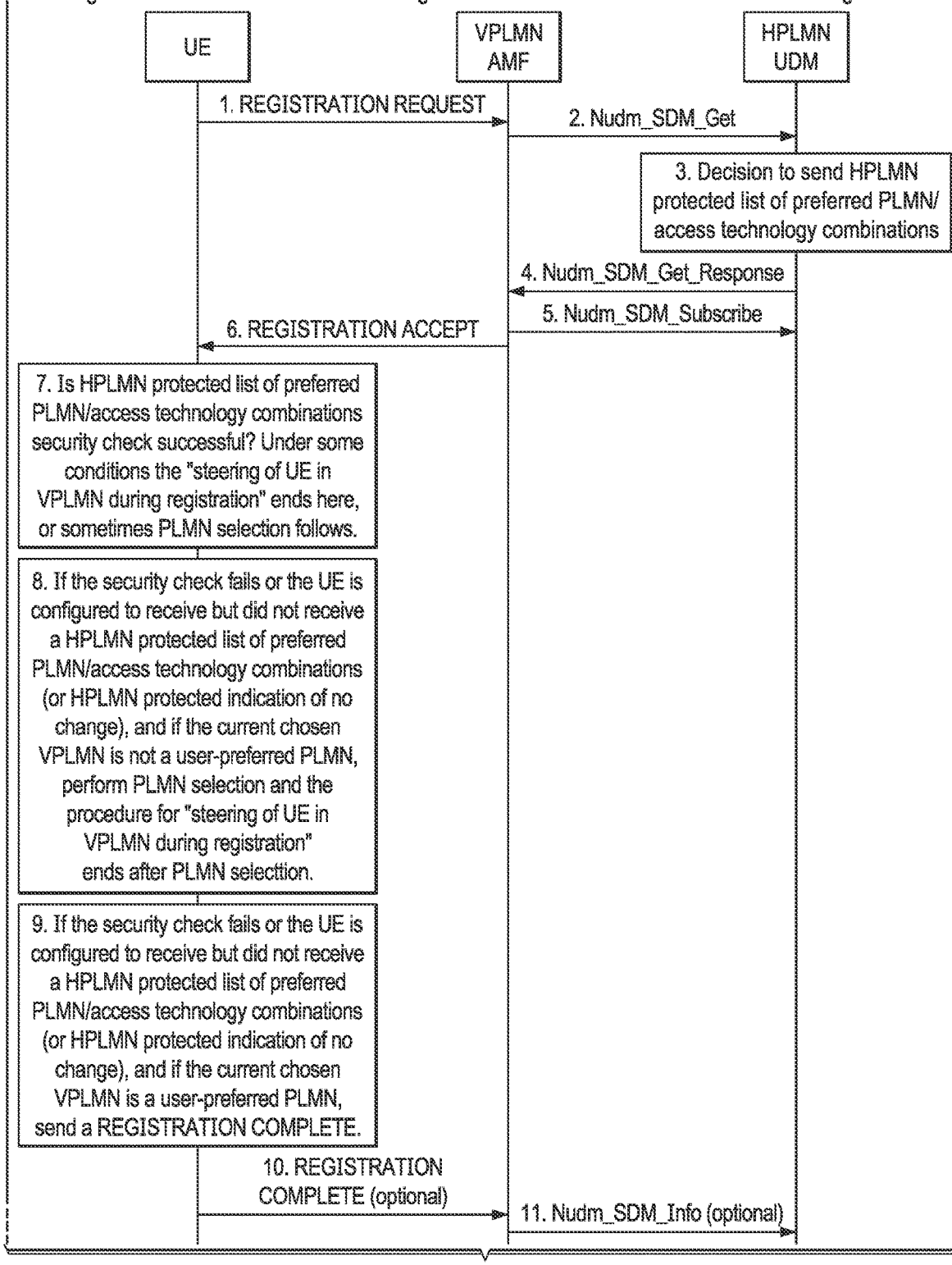

In message 10 of figure C.1.1 in FIGS. 15A-15B (i.e., REGISTRATION COMPLETE), the ME, if configured, can send one or more indications indicating that the SOR data was not received, that the SOR data failed security check, that the VPLMN the ME is currently attempting to register is a user-preferred PLMN, or that the ME is in a manual selection mode. As shown in the text in FIGS. 15C-15E, there can be two options for operations associated with message 10. In the second option, operation 10a can be performed if the SOR data is not successfully received (e.g., unsuccessful or failed security check), and operation 10b can be performed if the SOR data is successfully received (e.g., successful security check).

Figure 13:
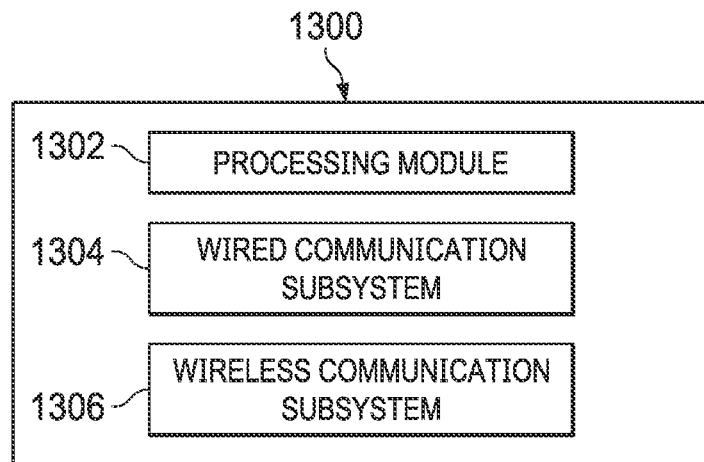
FIG. 13 is a schematic illustrating an example network node according to some implementations of the present disclosure.

FIG. 13 is a schematic illustrating an example network node 1300 according to some implementations of the present disclosure. For example, the network nodes 206, 208, 210, 604, 606, 704, 706, and 708 can be implemented by the network node 1300. The illustrated device 1300 includes a processing module 1302, a wired communication subsystem 1304, and a wireless communication subsystem 1306. The wireless communication subsystem 1306 can receive data traffic and control traffic from the UE. In some implementations, the wireless communication subsystem 1306 may include a receiver and a transmitter. The wired communication subsystem 1304 can be configured to transmit and receive control information between other access node devices via backhaul connections. The processing module 1302 can include one or more processing components (alternatively referred to as "processors" or "central processing units" (CPUs)) capable of executing instructions related to one or more of the processes, steps, or actions described above in connection with one or more of the implementations disclosed herein. The processing module 1302 can also include other auxiliary components, such as random access memory (RAM), read only memory (ROM), secondary storage (for example, a hard disk drive, flash memory or other non-transitory storage medium). The processing module 1302 can execute certain instructions and commands to provide wireless or wired communication, using the wired communication subsystem 1304 or a wireless communication subsystem 1306. Various other components can also be included in the device 1300.

Figure 14:
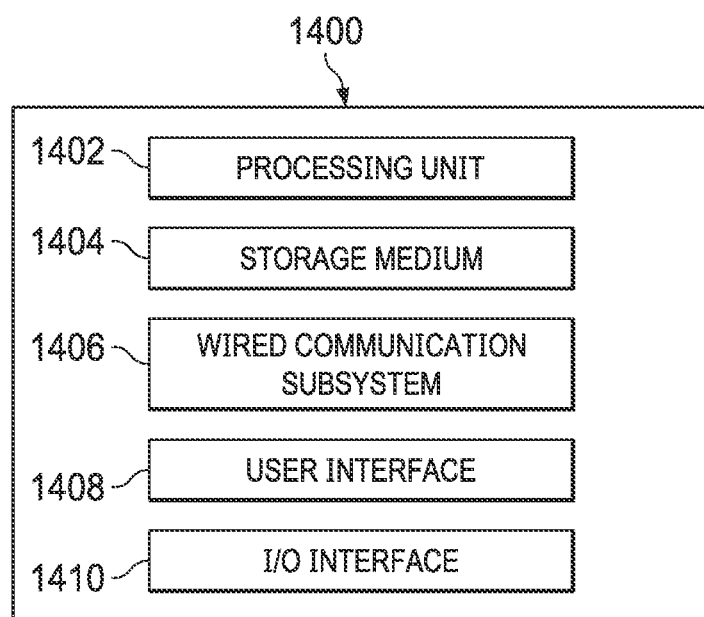
FIG. 14 is a schematic illustrating an example UE apparatus according to some implementations of the present disclosure.

FIG. 14 is a schematic illustrating an example UE 1400 apparatus according to some implementations of the present disclosure. The example UE 1400 includes a processing unit 1402, a computer-readable storage medium 1404 (for example, ROM or flash memory), a wireless communication subsystem 1406, an interface 1408, and an I/O interface 1410. The processing unit 1402 can include one or more processing components (alternatively referred to as "processors" or "central processing units" (CPUs)) configured to execute instructions related to one or more of the processes, steps, or actions described above in connection with one or more of the implementations disclosed herein. The processing unit 1402 can also include other auxiliary components, such as random access memory (RAM) and read only memory (ROM). The computer-readable storage medium 1404 can be embodied by a non-transitory medium configured to store an operating system (OS) of the device 1400 and various other computer-executable software programs for performing one or more of the processes, steps, or actions described above.

The wireless communication subsystem 1406 may be configured to provide wireless communications for data information or control information provided by the processing unit 1402. The wireless communication subsystem 1406 can include, for example, one or more antennas, a receiver, a transmitter, a local oscillator, a mixer, and a digital signal processing (DSP) unit. In some implementations, the subsystem 1406 can support multiple input multiple output (MIMO) transmissions. In some implementations, the receivers in the wireless communication subsystems 1406 can be an advance receiver or a baseline receiver. Two receivers can be implemented with identical, similar, or different receiver processing algorithms.

The user interface 1408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 1410 can include, for example, a universal serial bus (USB) interface. A skilled artisan will readily appreciate that various other components can also be included in the example UE device 1400.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
performing, by a user equipment (UE), a registration procedure, the registration procedure comprising sending a register request message to a visited public land mobile network (PLMN), wherein the register request message includes an indicator related to Steering of Roaming (SOR);
responsive to sending the indicator in the register request message, receiving, by the UE, a message with SOR data from a home PLMN, wherein the SOR data includes one or more preferred PLMNs; and
performing, by the UE, a PLMN selection based on the SOR data from the home PLMN.

2. The method of claim 1, wherein the register request message comprises a registration for emergency services, and performing the PLMN selection comprises performing the PLMN selection after the UE determined that there is no need to perform emergency services.

3. The method of claim 1, comprising: performing a security check on the SOR data.

4. The method of claim 1, wherein the UE comprises a mobile equipment (ME) and a Universal Integrated Circuit Card (UICC), and the ME forwards the SOR data to the UICC.

5. The method of claim 4, wherein the UICC comprises a universal subscriber identity module (USIM) and the ME receives a USIM application toolkit (USAT) command from the UICC with an indication to perform the PLMN selection.

6. The method of claim 5, wherein the PLMN selection is performed responsive to receiving the USAT command.

7. A user equipment (UE), comprising:
at least one hardware processor; and
a non-transitory computer-readable storage medium coupled to the at least one hardware processor and storing programming instructions for execution by the at least one hardware processor, wherein the programming instructions, when executed, cause the UE to:
perform a registration procedure, the registration procedure comprising sending a register request message to a visited public land mobile network (PLMN), wherein the register request message includes an indicator related to Steering of Roaming (SOR);
receive a message with SOR data from a home PLMN, wherein the SOR data includes one or more preferred PLMNs; and
perform a PLMN selection based on the SOR data from the home PLMN.

8. The UE of claim 7, wherein the programming instructions cause the UE to perform a security check on the SOR data.

9. The UE of claim 7, wherein the register request message comprises a registration for emergency services and the programming instructions cause the UE to perform the PLMN selection after the UE determined that there is no longer a need to perform emergency services.

10. The UE of claim 7, wherein the UE comprises a mobile equipment (ME) and a Universal Integrated Circuit Card (UICC) and the programming instructions cause the UE to forward the SOR data from the ME to the UICC.

11. The UE of claim 10, wherein the UICC comprises a universal subscriber identity module (USIM) and the programming instructions cause the ME to receive a USIM application toolkit (USAT) command from the UICC with an indication to perform the PLMN selection.

12. The UE of claim 11, wherein the programming instructions cause the UE to perform the PLMN selection responsive to receiving the USAT command.

13. A non-transitory computer-readable medium containing instructions which, when executed, cause a user equipment (UE) to perform operations comprising:
   performing, by the UE, a registration procedure, the registration procedure comprising sending a register request message to a visited public land mobile network (PLMN), wherein the register request message includes an indicator related to Steering of Roaming (SOR);
   responsive to sending the indicator in the register request message, receiving, by the UE, a message with SOR data from a home PLMN, wherein the SOR data includes one or more preferred PLMNs; and
   performing, by the UE, a PLMN selection based on the SOR data from the home PLMN.

14. The non-transitory computer-readable medium of claim 13, wherein the register request message comprises a registration for emergency services and performing the PLMN selection comprises performing the PLMN selection after the UE determines that there is no longer a need to perform emergency services.

15. The non-transitory computer-readable medium of claim 13, wherein the instructions cause the UE to perform a security check on the SOR data.

16. The non-transitory computer-readable medium of claim 13, wherein the UE comprises a mobile equipment (ME) and a Universal Integrated Circuit Card (UICC) and the instructions cause the ME to forward the SOR data to the UICC.

17. The non-transitory computer-readable medium of claim 16, wherein the UICC comprises a universal subscriber identity module (USIM) and the instructions cause the ME to receive a USIM application toolkit (USAT) command from the UICC with an indication to perform the PLMN selection.

18. The non-transitory computer-readable medium of claim 17, wherein the instructions cause the PLMN selection to be performed responsive to the ME receiving the USAT command.

* * * * *